United States Patent
Shibata

(10) Patent No.: US 9,064,327 B2
(45) Date of Patent: Jun. 23, 2015

(54) IMAGE PROCESSING METHOD, IMAGE PROCESSING DEVICE, IMAGE FORMING DEVICE AND INKJET RECORDING DEVICE

(71) Applicant: FUJIFILM Corporation, Tokyo (JP)

(72) Inventor: Hiroyuki Shibata, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/521,012

(22) Filed: Oct. 22, 2014

(65) Prior Publication Data

US 2015/0042717 A1 Feb. 12, 2015

Related U.S. Application Data

(63) Continuation of application No. PCT/JP2013/061465, filed on Apr. 18, 2013.

(30) Foreign Application Priority Data

Apr. 23, 2012 (JP) ................................ 2012-098187

(51) Int. Cl.
*B41J 29/38* (2006.01)
*G06T 3/40* (2006.01)
*B41J 2/02* (2006.01)

(52) U.S. Cl.
CPC . *G06T 3/4023* (2013.01); *B41J 2/02* (2013.01)

(58) Field of Classification Search
CPC ............ B41J 2/02; B41J 2/205; B41J 2/2139; G06T 3/4923; G06K 15/02; H04N 1/405; H04N 1/4015; H04N 1/4051
USPC .......................................................... 347/14
See application file for complete search history.

(56) References Cited

U.S. PATENT DOCUMENTS

| 2006/0214968 A1 | 9/2006 | Chiwata |
| 2006/0214971 A1 | 9/2006 | Yamazaki |
| 2011/0074862 A1 | 3/2011 | Sasayama |

FOREIGN PATENT DOCUMENTS

| JP | 2004-202795 A | 7/2004 |
| JP | 2006-76085 A | 3/2006 |
| JP | 2006-212793 A | 8/2006 |
| JP | 4614076 B2 | 1/2011 |
| JP | 2011-73286 A | 4/2011 |
| JP | 4670696 B2 | 4/2011 |
| JP | 2011-140194 A | 7/2011 |

OTHER PUBLICATIONS

International Search Report, issued in PCT/JP2013/061465, dated Jul. 30, 2013.
Written Opinion of the International Searching Authority, issued in PCT/JP2013/061465, dated Jul. 30, 2013.
International Preliminary Report on Patentability (IPRP) for International Application No. PCT/JP2013/061465, dated Nov. 6, 2014, along with an English translation thereof (Forms: PCT/IB/338, PCT/IB/373, PCT/ISA/237, PCT/IB/326).

*Primary Examiner* — Alessandro Amari
*Assistant Examiner* — Michael Konczal
(74) *Attorney, Agent, or Firm* — Birch, Stewart, Kolasch & Birch, LLP

(57) ABSTRACT

An image processing method includes: applying mask processing to an abnormal recording element based on abnormal recording element information; converting input image data such that a pixel to be formed by the abnormal recording element is excluded; applying quantization processing that converts the converted input image data to image data having a gradation number less than a gradation number of the converted input image data; and assigning each pixel forming image data after quantization processing to a normal recording element.

13 Claims, 18 Drawing Sheets

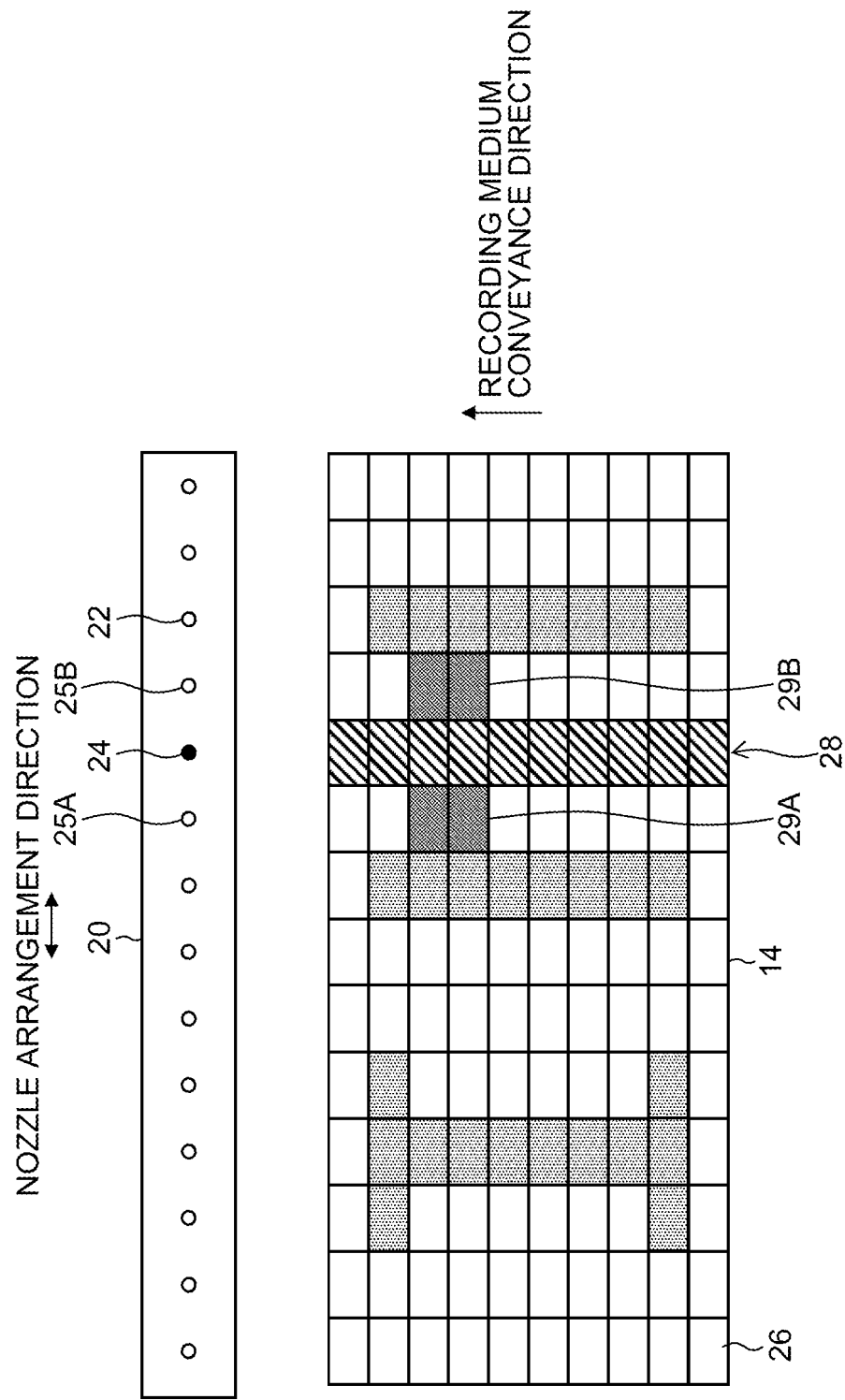

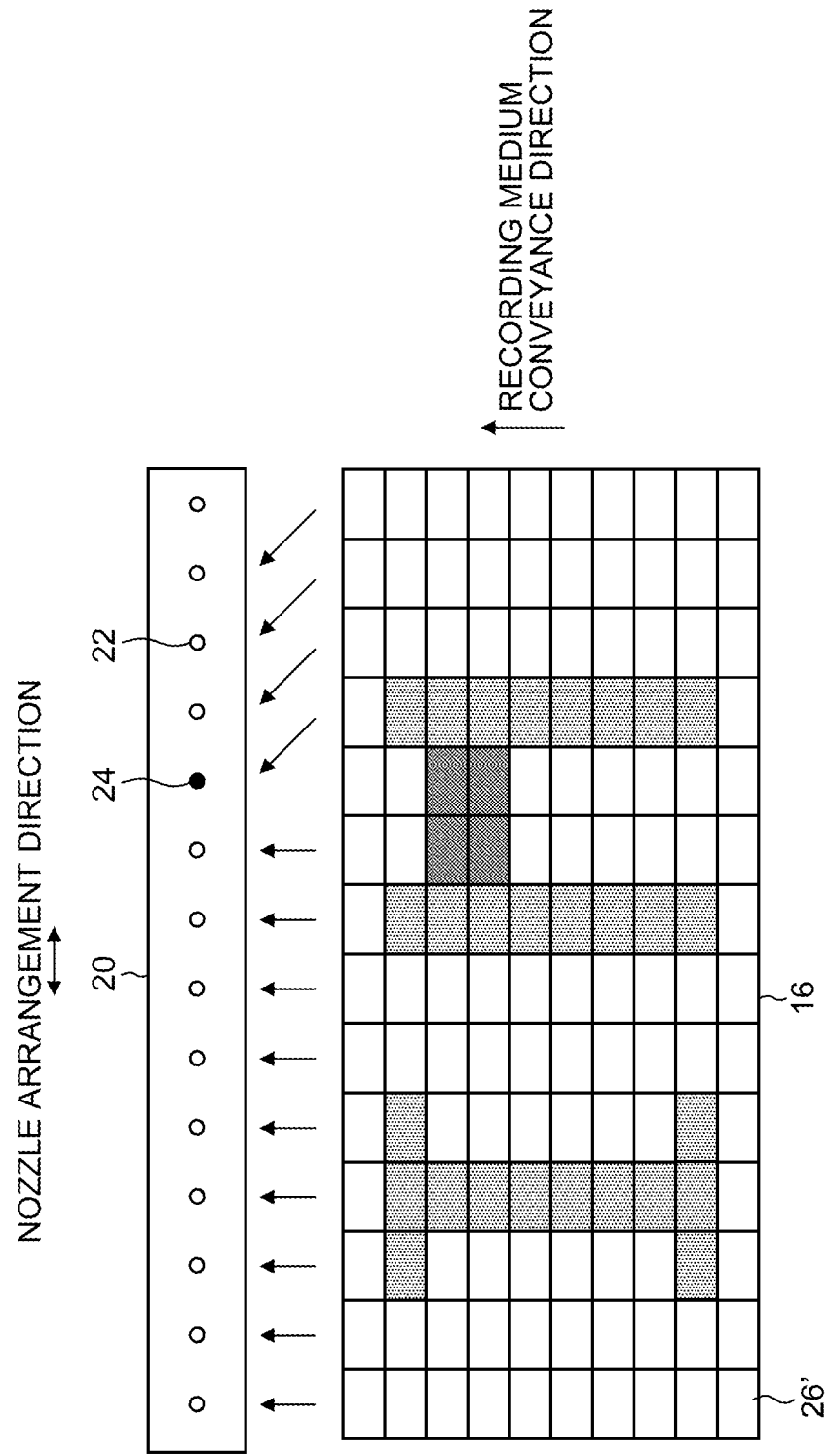

FIG.9

| C | C | B | B | B |
|---|---|---|---|---|
| C | C | B | B | B |
| C | C | B | B | B |
| C | C | B | B | B |
| C | C | 5 | B | B |
| C | A | 3 | B | B |
| C | 7 | 1 | B | B |
| C | B | B | B | B |
| C | B | B | B | B |
| C | B | B | B | B |
| C | B | B | B | B |
| C | B | B | B | B |
| C | B | B | B | B |

ARROW: QUANTIZATION PROCESSING DIRECTION

IMAGE PROCESSING METHOD, IMAGE PROCESSING DEVICE, IMAGE FORMING DEVICE AND INKJET RECORDING DEVICE

CROSS-REFERENCE TO RELATED APPLICATIONS

This application is a Continuation of PCT International Application No. PCT/JP2013/061465 filed on Apr. 18, 2013, which claims priority under 35 U.S.C §119(a) to Japanese Patent Application No. 2012-098187 filed on Apr. 23, 2012. Each of the above applications is hereby expressly incorporated by reference, in their entirety, into the present application.

BACKGROUND OF THE INVENTION

1. Field of the Invention

The present invention relates to an image processing method, an image processing device, an image forming device, and an inkjet recording device, and particularly relates to a quantization processing technology that converts multi-gradation image data into image data of a gradation number less than an original gradation number.

2. Description of the Related Art

An inkjet recording device that forms a color image on a recording medium has a configuration including an inkjet head of a full line type in which nozzles are installed over a length corresponding to an entire width of the recording medium.

In a single pass scheme, a full-line type inkjet head and a recording medium are relatively moved only once, and an image is formed over a whole surface of the recording medium. According to this single pass scheme, it is possible to perform image formation at higher speed than a serial scheme in which the head is carried in a main scanning direction to perform image formation in the same direction while the recording medium is intermittently sent at predetermined feed pitches in a sub-scanning direction.

In inkjet image formation of the single pass scheme, when an abnormal nozzle occurs like abnormality of an ejection (flying) direction, abnormality of an ejection droplet amount and non-ejection, and so on, a streak (streak-like density unevenness) so occurs. There is known a technique that masks the abnormal nozzle, applies density correction to a normal nozzle near the abnormal nozzle and lowers the visibility of the streak in order to suppress the occurrence of the streak resulting from the occurrence of the abnormal nozzle.

Japanese Patent No. 4604614 (PTL 1) discloses a technology that lowers the visibility of streak by converting a defective nozzle pixel into a minimum density and assigning a density conversion table of a higher density than a peripheral nozzle to the peripheral nozzle of a defective nozzle.

Japanese Patent Application Laid-Open No. 2004-202795 (PTL 2) discloses a technology that selects a dither matrix based on the position of a defective nozzle and performs quantization processing.

Japanese Patent No. 4670696 (PTL 3) discloses an image processing method that prevents an occurrence of an artifact in an output image by acquiring non-ejection position information in quantization processing to generate pseudo-gradation data from input image data and replacing a basic threshold matrix with a sub-matrix for non-ejection (a threshold matrix that realizes dot arrangement in which a streak due to non-ejection is not remarkable) with respect to a peripheral region including the non-ejection position.

Japanese Patent No. 4614076 (PTL 4) discloses a technology that corrects a threshold matrix based on an error in nozzle ejection characteristics, reduces image density unevenness and reduces graininess in digital half-toning using the threshold matrix.

SUMMARY OF THE INVENTION

However, when the technology disclosed in PTL 1 is used for quantization processing by a threshold matrix, since a dot pattern to be formed on a threshold matrix may not be formed in an image position corresponding to a defective nozzle, a halftone pattern collapses. As a result, graininess deteriorates, and it is visually checked as an artifact.

When the technology disclosed in PTL 2 is applied to the problem of above-mentioned PTL 1, there is a possibility that it is possible to suppress granular deterioration. However, since a dedicated threshold matrix is prepared around a non-ejection position, a memory to store this dedicated threshold matrix is required. Moreover, when non-ejection of various periods is tried to be supported, it is necessary to prepare more threshold matrices.

Therefore, as disclosed in PTL 3, when it is replaced with a smaller sub-matrix in order to suppress an increase in a memory capacity, it becomes difficult to sufficiently secure pattern continuity in a junction between a region that is replaced with the sub-matrix and a region that is not replaced with the sub-matrix. Therefore, a granule deteriorates in a streak manner in the junction between both of the regions, and the streak may not be able to be appropriately corrected.

In the technology disclosed in PTL 4, since the thresholds of threshold matrices in the same column are replaced so as to improve a granule, granular deterioration may be suppressed. However, in a case where a large number of non-ejection nozzles occur, since the processing time of a process to replace the thresholds greatly increases, it is not possible to implement prompt processing. Therefore, it is not possible to perform high-speed printing that is an advantage of the single pass scheme.

The present invention is made in view of such conditions, and it is an object to provide an image processing method, image processing device, image forming device and inkjet recording device that correct a streak without causing an artifact in a record image while suppressing a cost increase in a simple manner.

To achieve the above-mentioned object, an image processing method according to a mode of the present invention includes: an abnormal recording element information acquisition step of acquiring abnormal recording element information; a mask processing step of applying mask processing to an abnormal recording element based on the acquired abnormal recording element information; an input image data conversion step of converting input image data such that a pixel to be formed by the abnormal recording element is excluded based on the acquired abnormal recording element information; a quantization processing step of applying quantization processing that converts the converted input image data to image data having a gradation number less than a gradation number of the converted input image data; and a recording element assignment step of assigning each pixel forming image data after quantization processing to a normal recording element excluding the abnormal recording element.

According to the present invention, an abnormal recording element is masked based on abnormal recording element information, and input image data is converted such that a pixel to be formed by the abnormal recording element is excluded from the target of quantization processing. Therefore, the occurrence of discontinuity of quantization processing due to the mask of the abnormal recording element is suppressed, and the occurrence of an artifact due to the discontinuity of quantization processing is suppressed. Therefore, graininess of an output image is not deteriorated.

BRIEF DESCRIPTION OF THE DRAWINGS

FIG. 5 is an explanatory diagram of a density correction process of a peripheral pixel;

FIG. 6 is an explanatory diagram of an input image data conversion process;

FIG. 9 is an explanatory diagram of error diffusion processing;

DETAILED DESCRIPTION OF EXEMPLARY EMBODIMENTS

In the following, modes to implement the present invention are described in detail according to the accompanying drawings.

[Outline of Image Processing Method]

Figure 1:
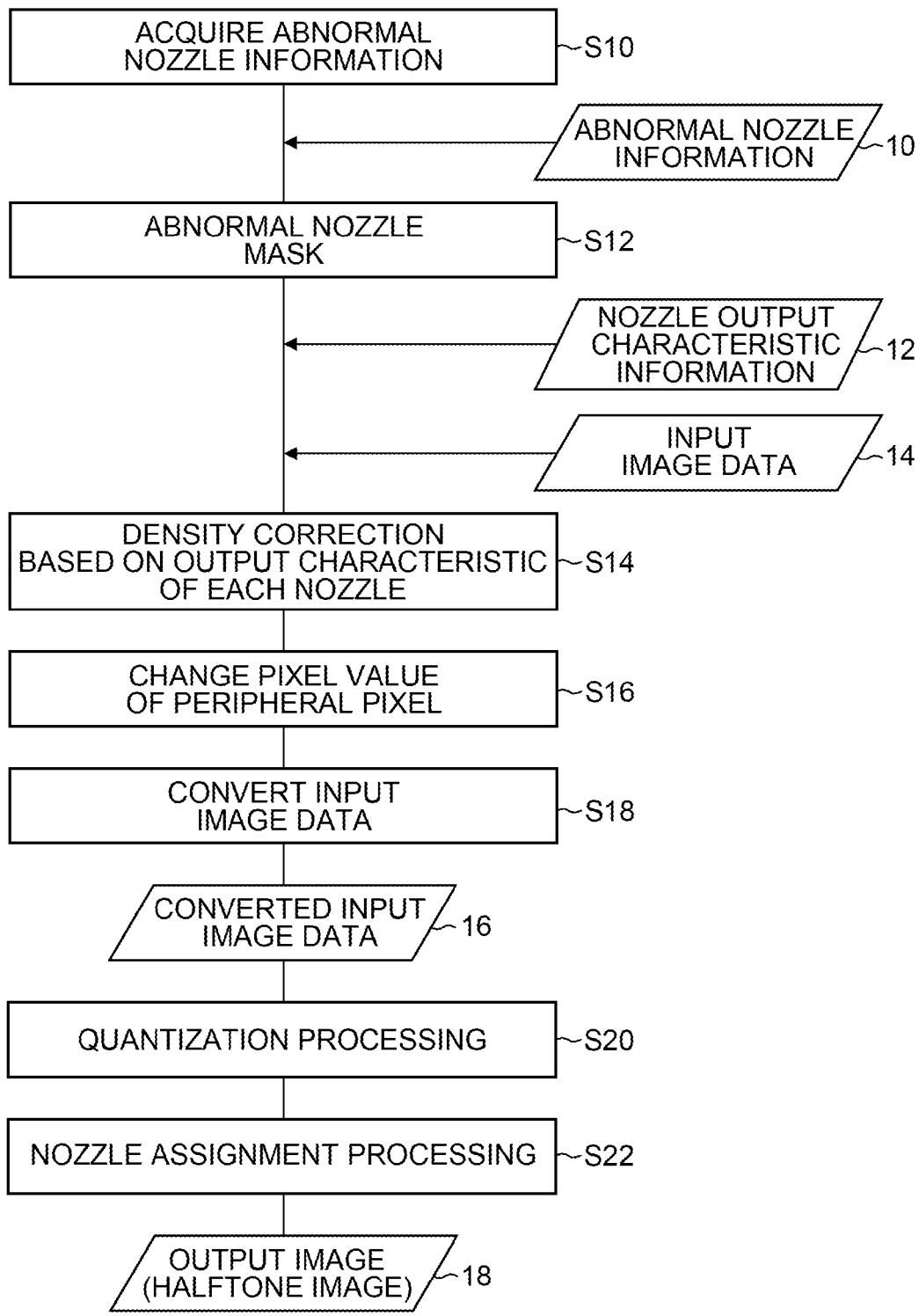
FIG. 1 is a flowchart illustrating a flow of an image processing method according to an embodiment of the present invention.

FIG. 1 is a flowchart illustrating a flow of an image processing method according to the present invention. In the following explanation, image formation of a single pass scheme using a fill-line type inkjet head (recording head, see FIG. 16) is presumed.

"Full-line type inkjet head" is an inkjet head having a structure in which multiple nozzles (recording elements) are disposed over length corresponding to a total length of a recording medium in a direction (illustrated with reference character M in FIG. 16) orthogonal to a conveyance direction (illustrated with reference character S in FIG. 16) of the recording medium (total length of an image forming region in the same direction).

Moreover, "single pass scheme" is a scheme to relatively move an inkjet head and a recording medium only once and form an image over a whole surface of the recording medium (whole area of an image forming region).

In the image processing method illustrated in the figure, input image data is converted such that a pixel to be formed by an abnormal nozzle is excluded from the target of quantization processing. Here, "pixel" is a constituent unit of an input image and output image, and one pixel of the output image is formed with one dot or multiple dots.

The image processing method shown in the present embodiment includes an abnormal nozzle information acquisition process (step S10, abnormal recording element information acquisition process) in which abnormal nozzle information 10 is acquired, and an abnormal nozzle mask processing process (step S12, mask processing process) in which mask processing is applied to a pixel to be formed by the abnormal nozzle based on the abnormal nozzle information 10 acquired in the abnormal nozzle information acquisition step.

Moreover, it includes a pixel value correction process (step S14) in which the pixel value (density value) of the pixel formed by each nozzle is corrected based on output characteristic (ejection characteristic) information 12 of each nozzle, and a pixel value change process (step S16) in which the pixel value of a pixel formed by a peripheral nozzle of the abnormal nozzle is changed.

In addition, it includes an input image data conversion process (step S18) in which input image data 14 is converted such that the pixel masked in the abnormal nozzle mask processing process is excluded from quantization processing, a quantization processing process (step S20) in which quantization processing is performed on converted input image data 16, and a nozzle assignment process (step S22, recording element assignment process) in which each pixel of halftone image data after quantization processing is assigned to a normal nozzle excluding the abnormal nozzle.

Through each process mentioned above, an output image (halftone image) 18 of lower gradation than input image data is generated from the multi-gradation input image data.

As an example of the output image (halftone image), there is multivalued image data of binary, three values or four values, and so on. As an example of expressing a multi-value, there are a mode in which the size of a dot forming one pixel is changed and a mode in which the number of dots forming one pixel is changed (see FIGS. 7 and 8).

In the following, each process illustrated in FIG. 1 is described in detail.

[Explanation of Abnormal Nozzle Information Acquisition Process]

Figure 2:
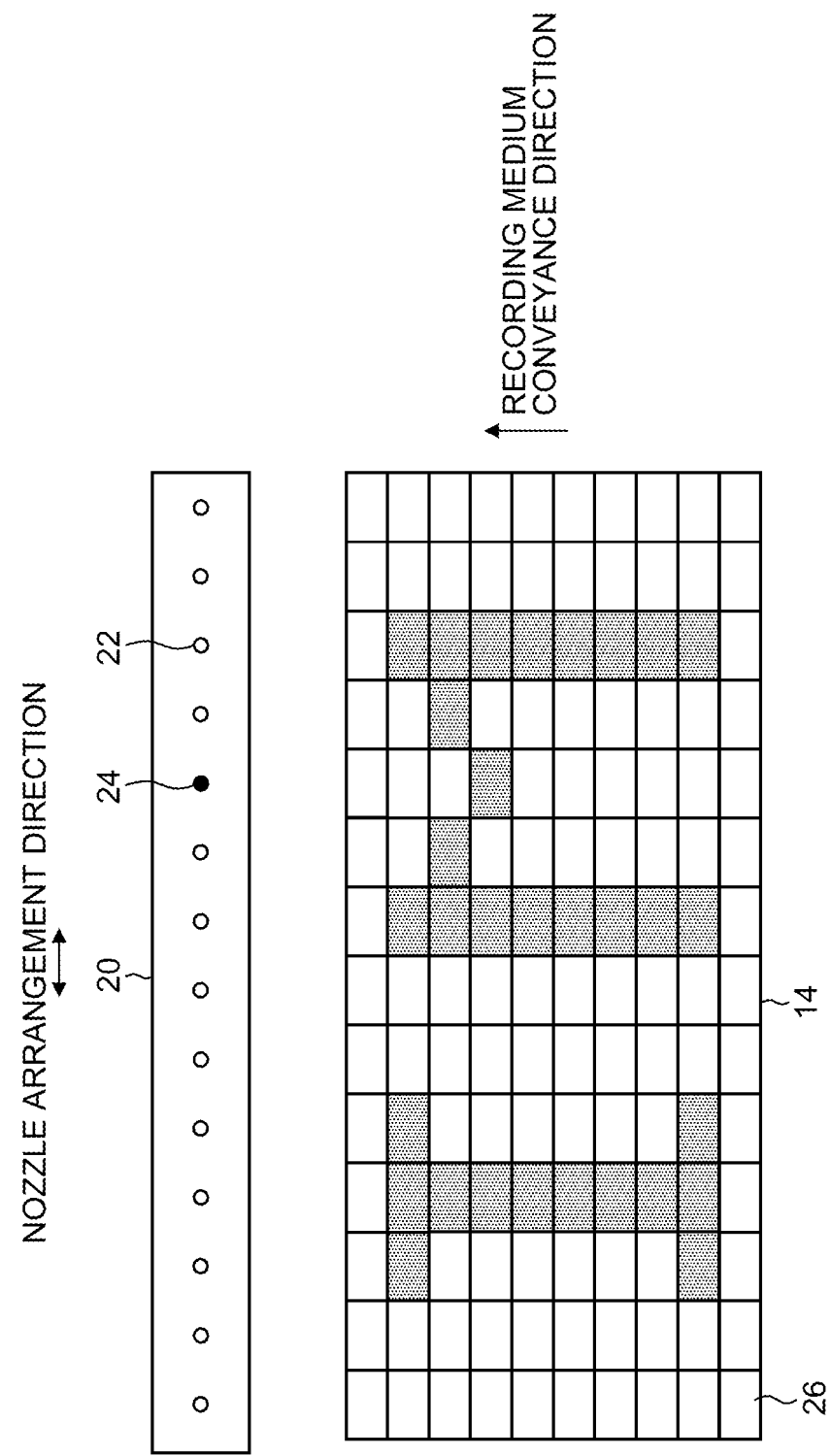
FIG. 2 is an explanatory diagram illustrating a relationship between each nozzle and input image data.

FIG. 2 is an explanatory diagram illustrating the relationship between each nozzle included in an inkjet head and a pixel of input image data (output image). Here, the input image data 14 illustrated in FIG. 2 typically develops and illustrates raster data having pixel values 0 (HEX) to 255 (HEX) in a two-dimensional manner. One rectangle with reference numeral 26 shows a pixel. A pixel with a dot hatch denotes a pixel in which a dot is formed.

Here, the input image data 14 denotes data of the print division image of each color subjected to color separation every ink color (K (black), C (cyan), M (magenta) and Y (yellow)), and the same processing is applied to the print division image of each color.

In an inkjet head 20 illustrated in FIG. 2, multiple nozzles 22 are arranged along a direction orthogonal to a conveyance direction of a recording medium. An illustrated nozzle 24 in black shows an abnormal nozzle.

In the abnormal nozzle information acquisition process (step S10) illustrated in FIG. 1, the abnormal nozzle information 10 stored in a predetermined memory is acquired. "Abnormal nozzle" includes a non-ejection nozzle which cannot eject ink, and a nozzle which can eject ink and in which an abnormality of the ink flying direction (ink impact position) or an abnormality of an ink ejection amount is caused.

The abnormal nozzle information 10 includes the number of the abnormal nozzle 24 (in a case where n nozzles are included, one of consecutive values from 1 to n) and the state of the abnormal nozzle (non-ejection or ejection abnormality). As the abnormal nozzle information 10, information which is detected at the time of inspection of the inkjet head 20 and stored in a predetermined memory may be acquired. Moreover, the detection of ejection abnormality of the inkjet head 20 may be implemented and the detection result may be acquired as the abnormal nozzle information 10.

[Explanation of Abnormal Nozzle Mask Processing Process]

Figure 3:
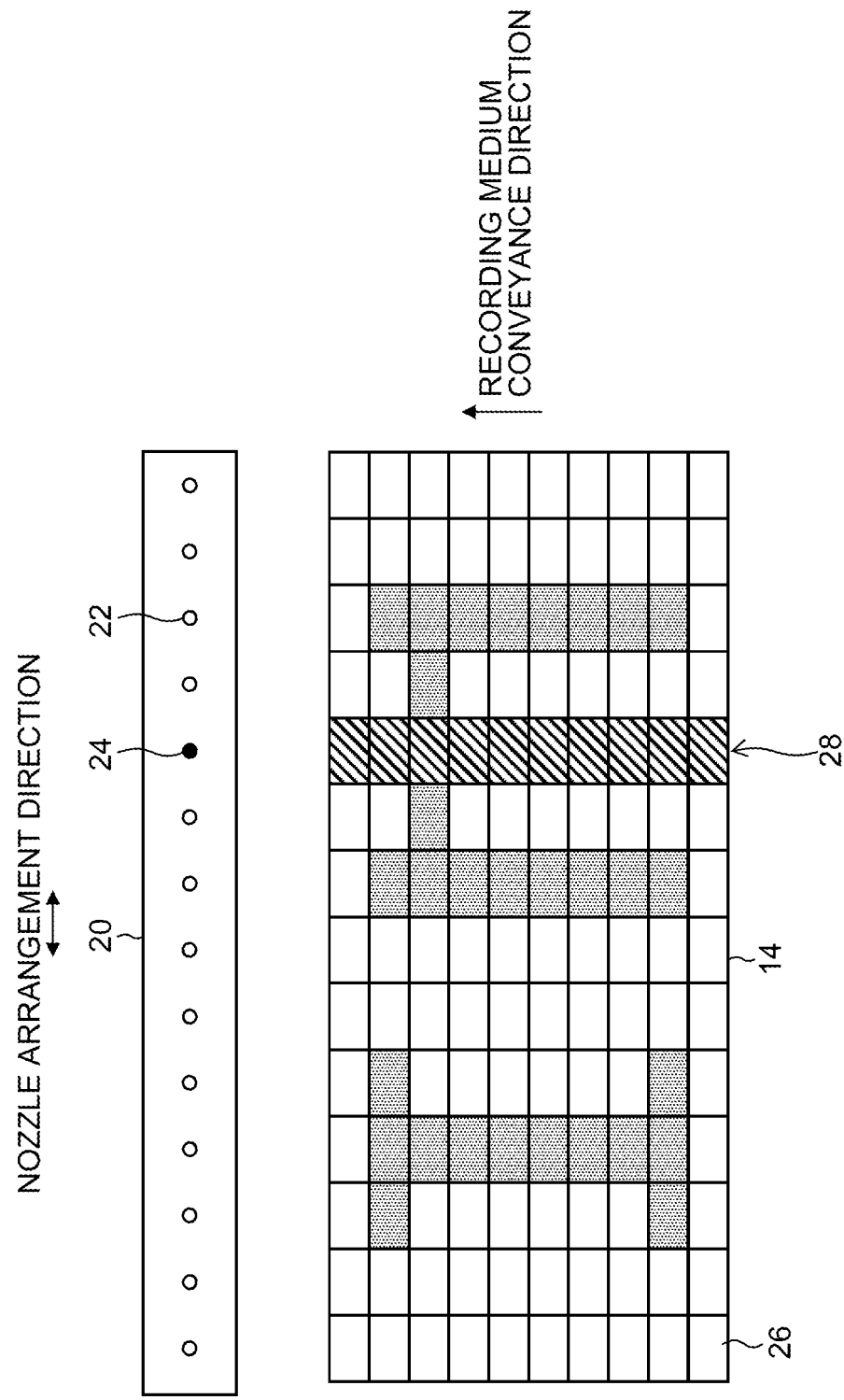
FIG. 3 is an explanatory diagram of an abnormal nozzle mask process.

FIG. 3 is an explanatory diagram of the abnormal nozzle mask process (step S12 in FIG. 1). Here, in the following explanation, the same reference numerals are assigned to parts identical or similar to FIG. 2 and the explanation is omitted.

In FIG. 3, a pixel group (pixel column) 28 illustrated with a slash hatch denotes a group of pixels formed by the abnormal nozzle 24 and is masked. That is, in the abnormal nozzle mask processing process, the pixel group 28 to be formed by the abnormal nozzle 24 is masked based on abnormal nozzle information, and the pixel group 28 is excluded from the processing target of quantization processing (step S20 in FIG. 1).

As an example of mask processing, there are a mode in which a threshold at the time of quantization processing corresponding to the pixel group 28 to be formed by the abnormal nozzle is changed into the maximum pixel value of input image data and a mode in which the pixel value of each pixel of the pixel group 28 in the input image data is changed to minimum pixel value "0 (HEX)".

Here, in a full-line type inkjet head, since the pixel formed by each nozzle corresponds to pixels of one column in a direction parallel to the conveyance direction of a recording medium, the pixel group 28 to be formed by the abnormal nozzle becomes a pixel column of one column along the same direction.

[Explanation of Density Correction Process Based on Output Characteristic of Each Nozzle]

Figure 4:
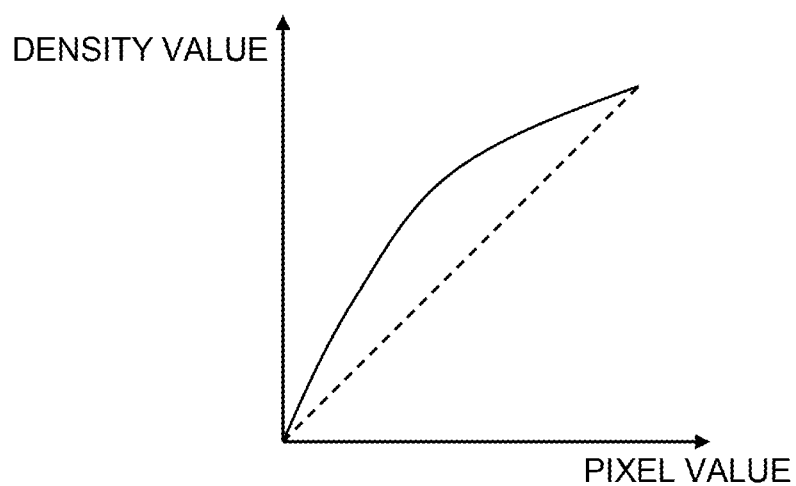
FIG. 4 is an explanatory diagram of a density correction LUT.

FIG. 4 is an explanatory diagram of a density correction LUT (lookup table) applied to the density correction process (step S14 in FIG. 1) based on the output characteristic of each nozzle. In the density correction LUT illustrated in FIG. 4, the density value with respect to the pixel value (gradation value) is stored every nozzle in a table format.

In a nozzle having an ideal output characteristic, the relationship between the pixel value and the density value is linear (proportional relationship) as shown by a broken line in FIG. 4. In an actual nozzle, as shown by a solid line in the figure, the relationship between the pixel value and the density value becomes non-linear due to manufacturing variation or assembly variation of an inkjet head.

Therefore, with reference to the density correction LUT, the relationship between the pixel value and the density value is corrected in pixel column units (or pixel units) every nozzle. Here, the pixel group 28 formed by the abnormal nozzle 24 is excluded from the target of density correction based on the output characteristic of each nozzle.

[Explanation of Pixel Value Change Process of Peripheral Pixel]

FIG. 5 is an explanatory diagram of the pixel value change process of a peripheral pixel (step S16 in FIG. 1). Since the pixel group 28 to be formed by the abnormal nozzle 24 is masked, the pixels of the pixel group 28 are lacked without being formed in an output image.

Then, the occurrence of a white streak (density unevenness along an orthogonal direction (recording medium conveyance direction) to a nozzle arrangement direction) resulting from a decrease in the number of dots (decrease in density) due to the lack of this pixel group 28 is worried about.

Therefore, by changing the pixel values of a pixel 29A formed by a normal nozzle 25A in the peripheral of the abnormal nozzle 24 and a pixel 29B formed by a nozzle 25B, a decrease in the density in the output image is compensated for and the visibility of the white streak is lowered.

In the example illustrated in FIG. 5, peripheral normal nozzles of the abnormal nozzle 24 are assumed to be the normal nozzles 25A and 25B adjacent to the abnormal nozzle 24, and the pixel values of the pixel 29A formed by the nozzle 25A and the pixel 29B formed by the nozzle 25B are raised.

Here, "peripheral normal nozzles of the abnormal nozzle 24" can be assumed to be multiple normal nozzles including the normal nozzles adjacent to the abnormal nozzle 24.

As an example of raising the pixel values of the peripheral normal nozzles 25A and 25B of the abnormal nozzle 24, there are a mode in which input image data is multiplied by a constant over 1 and a mode in which the pixel value of the pixel formed by the abnormal nozzle 24 is added.

Here, a pixel whose pixel value is changed may be one pixel adjacent to the pixel (pixel lacked in the output image) formed by the abnormal nozzle 24 or may be multiple pixels including the one adjacent pixel. In the example illustrated in FIG. 5, two pixels including the one adjacent pixel are assumed to be the pixel value change targets.

In a case where a multi-dot (detailed below in detail) is applied to quantization processing, a mode is preferable in which the pixel value of the peripheral pixel is changed so as to become a dot of the maximum size or the maximum number.

[Explanation of Input Image Data Conversion Process]

FIG. 6 is an explanatory diagram of the input image data conversion process (step S18 in FIG. 1). In converted input image data 16 illustrated in FIG. 6, pixels other than the pixel group 28 to be formed by the abnormal nozzle 24 are shifted in column units such that the pixel group 28 (see FIG. 5) to be formed by the abnormal nozzle 24 is removed and the removed pixel group 28 is made up.

That is, since a lack in the pixel group is made up by other pixels (pixel group) by performing shift in pixel column units toward the direction of the pixel group 28 in order from the pixel column adjacent to the removed pixel group 28, the continuity of a quantization processing pattern is maintained (the quantization processing pattern is prevented from becoming discontinuous).

Here, reference numeral 26' is attached to pixels forming the converted input image data 16 illustrated in FIG. 6.

[Quantization Processing Process]

In the quantization processing process (step S20 in FIG. 1), a quantization technique such as a dither method and an error diffusion method is applied to the converted input image data 16 (see FIG. 6), and a binary or multivalued (three-valued or four-valued, and so on) halftone image (illustrated with reference numeral 19 in FIG. 12) is formed.

In the dither method, the pixel value of each image pixel and a threshold are compared by a dither matrix in which the threshold of quantization is disposed in a two-dimensional manner. Further, in a case where the pixel value is equal to or greater than the threshold, a dot is formed to the pixel. By contrast, in a case where the pixel value is less than the threshold, the dot is not formed to the pixel. By performing magnitude comparison with the pixel value by the use of multiple thresholds, a multi-valued halftone image is generated.

FIGS. 7A to 7D are explanatory diagrams of a multi-dot. "Multi-dot" is a technique of expressing one pixel of the output image (halftone image) by multi-value (multi-gradation). The multi-dot illustrated in FIGS. 7A to 7D expresses one pixel by four values by the use of the presence of the dot and three kinds of dot sizes.

Figure 7A:
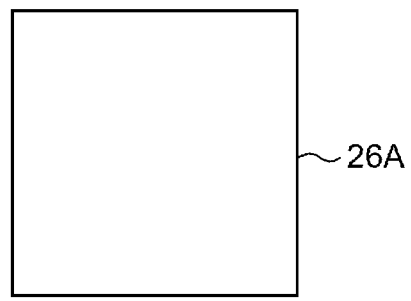
FIG. 7A is an explanatory diagram of a multi-dot.
Figure 7B:
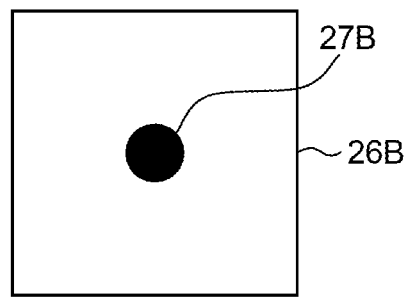
FIG. 7B is an explanatory diagram of a multi-dot.
Figure 7C:
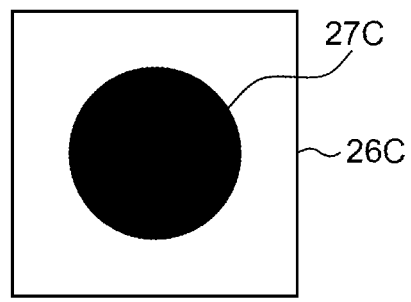
FIG. 7C is an explanatory diagram of a multi-dot.
Figure 7D:
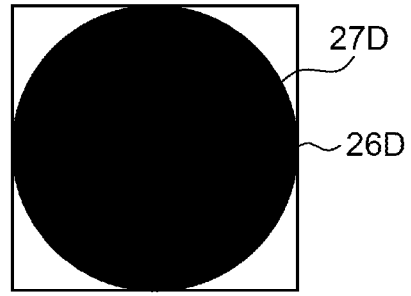
FIG. 7D is an explanatory diagram of a multi-dot.

A pixel 26A illustrated in FIG. 7A shows pixel value "0", and a dot is not formed. A pixel 26B illustrated in FIG. 7B shows pixel value "1", and a small dot 27B is formed. A pixel 26C illustrated in FIG. 7C shows pixel value "2", and a medium dot 27C (>small dot 27B) is formed. A pixel 26D illustrated in FIG. 7D shows pixel value "3", and a large dot 27D (>medium dot 27C) is formed.

FIGS. 8A to 8D are explanatory diagrams illustrating another mode of the multi-dot. In the multi-dots illustrated in FIGS. 8A to 8D, one pixel is configured with multiple dots and pixel values "0" to "3" are expressed by the number of dots.

Figure 8A:
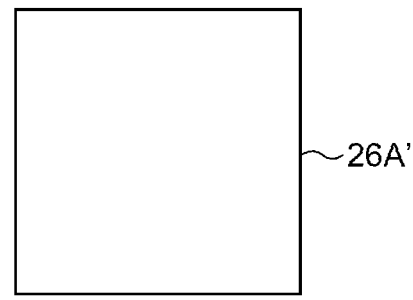
FIG. 8A is an explanatory diagram of another mode of a multi-dot.
Figure 8B:
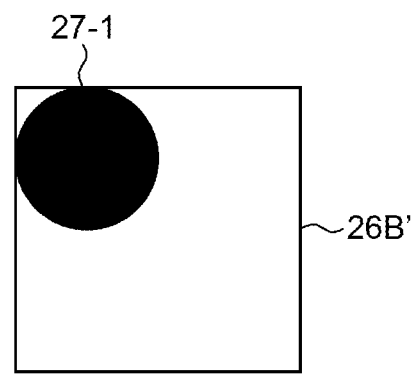
FIG. 8B is an explanatory diagram of another mode of a multi-dot.
Figure 8C:
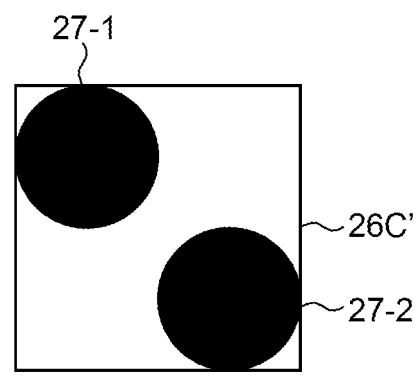
FIG. 8C is an explanatory diagram of another mode of a multi-dot.
Figure 8D:
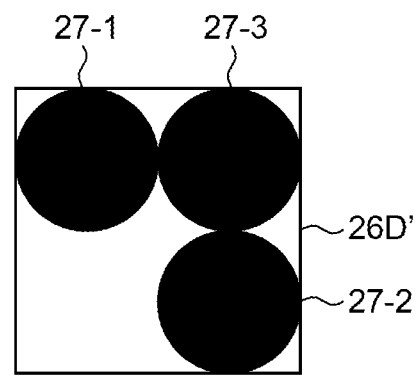
FIG. 8D is an explanatory diagram of another mode of a multi-dot.

A pixel 26A' illustrated in FIG. 8A shows pixel value "0", and a dot is not formed. A pixel 26B' illustrated in FIG. 8B shows pixel value "1", and one dot (dot 27-1) is formed. A pixel 26C' illustrated in FIG. 8C shows pixel value "2", and two dots (dots 27-1 and 27-2) are formed. A pixel 26D' illustrated in FIG. 8D shows pixel value "3", and three dots (dot 27-1, dot 27-2 and dot 27-3) are formed.

Thus, by using the multi-dot for quantization processing, it is possible to form a multivalued output image (halftone image). Here, a mode of the multi-dot is not limited to the modes illustrated in FIGS. 7A to 7D and 8A to 8D, and other modes may be applicable.

FIG. 9 is an explanatory diagram of the error diffusion method. In the figure, a pixel with "A" is a processing target pixel, a pixel with "B" is an unprocessed pixel, and a pixel with "C" is a processed pixel. Moreover, unprocessed pixels with values "1", "3", "5" and "7" in the surroundings of the processing target pixel denote unprocessed images in which an error (quantization error) cause by quantization of the processing target pixel is diffused, and the values show the error diffusion ratios (value/16).

In the error diffusion method, the pixel value of the processing target pixel and a threshold are compared, and, based on the comparison result, it is decided whether there is dot generation in each pixel. Moreover, the difference between the pixel value and the threshold is diffused to unprocessed pixels in the surroundings of the processing target pixel at a predetermined ratio as a quantization error.

In a case where a pixel to which another pixel quantization error is diffused is processed, the value adding the diffused error to the original pixel value and the threshold are compared. Moreover, the difference between the addition value of the original pixel value and the diffused error and the threshold is diffused to peripheral unprocessed pixels as a quantization error. By sequentially performing such processing in a predetermined processing order, a binary or multivalued halftone image is formed.

Figure 10:
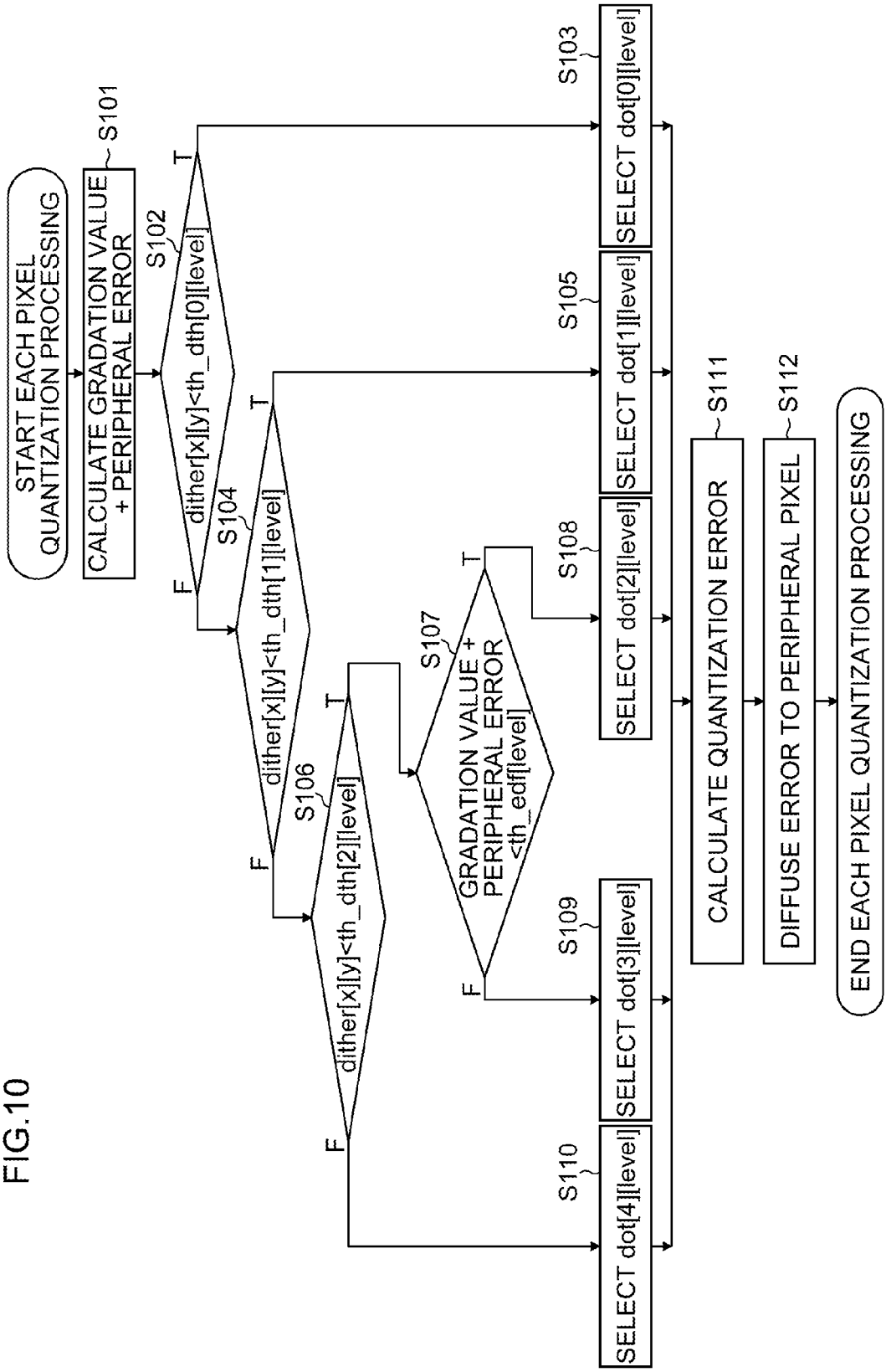
FIG. 10 is a flowchart illustrating a flow of quantization processing of a dither error diffusion combination scheme.

FIG. 10 is a flowchart illustrating the flow of quantization processing to which the dither error diffusion combination scheme is applied and a multi-dot is applied. In the figure, dither[x][y] designates an element (dither value) of a two-dimensional dither matrix. th_dth[i][level] designates a threshold compared with the dither matrix (i=0, 1, 2). th_edf[level] designates an error diffusion threshold.

dot[j][level] is associated with any dot size of "no drop" (j=0), "small drop" (j=1), "medium drop" (j=2) and "large drop" (j=3) every pixel value (level). Here, dot[j][level] with a pixel value as a parameter is stored in a lookup table.

When the quantization processing of each pixel starts, first, a pixel value (gradation value) including a peripheral error is calculated, which is the sum of the original pixel value (original gradation value) of a target pixel and the peripheral error (error that occurs at the time of quantization processing of the peripheral pixel) diffused to the target pixel by error diffusion (step S101).

Next, the region of an image is divided by comparing the dither value (dither[x][y]) and threshold th_dth[i][level]. This threshold th_dth[i][level] is set every pixel value (level) of the target pixel, and is stored in a predetermined memory beforehand.

Here, it is divided into four regions using the first threshold (th_dth[0][level]), the second threshold (th_dth[1][level]) and the third threshold (th_dth[2][level]).

In step S102, the dither value (dither[x][y]) and the first threshold (th_dth[0][level]) are compared. In step S102, in the case of dither[x][y]<th_dth[0][level] (True), the dot size specified by dot[0][level] is selected (step S103).

By contrast, in the case of dither[x][y]≥th_dth[0][level] (Failure), it proceeds to step S104, and the dither value (dither[x][y]) and the second threshold (th_dth[1][level]) are compared. In the case of dither[x][y]<th_dth[i][level] (True), the dot size specified by dot[1][level] is selected (step S105). By contrast, in the case of dither[x][y]≥th_dth[1][level] (Failure), it proceeds to step S106.

In step S106, the dither value (dither[x] [y]) and the third threshold (th_dth[2][level]) are compared. In the case of dither[x][y]<th_dth[2][level] (True), it proceeds to step S107, and the pixel value including a peripheral error and error diffusion threshold th_edf[level] are compared.

Here, error diffusion threshold th_edt[level] is set every pixel value of the target pixel and stored in a predetermined memory beforehand. In step S107, in the case of (pixel value+peripheral error)<th_edf[level] (True), the dot size specified by dot[2][level] is selected (step S108).

In the case of (pixel value+peripheral error)≥th_edf[level] (Failure), the dot size specified by dot[3][level] is selected (step S109).

That is, in the region of th_dth[1][level]≤dither[x][y] <th_dth[2][level], quantization processing by an error diffusion method is performed.

In step S106, in the case of dither[x][y]≥th_dth[2][level] (Failure), the dot size specified by dot[4][level] is selected (step S110).

Here, the dot size expressed by dot[j][level] can be arbitrarily decided every pixel value. For example, with respect to a certain pixel value ([level]), it is possible to decide dot[0][level] as a small drop, dot[1][level] as a medium drop, dot[2][level] as no drop and dot[3][level] and dot[4][level] as a large drop, and so on.

Thus, when quantization processing is applied every region divided according to the pixel value and the dot size of a processing target pixel is selected, a quantization error is calculated (step S111). The quantization error is a difference with a threshold of quantization processing of the pixel value (which may include an error diffused from a peripheral pixel).

The quantization error calculated in step S111 is diffused to a peripheral unprocessed pixel according to a predetermined error diffusion matrix (step S112). Quantization processing with respect to all pixels is performed by performing steps S101 to S112 on all pixels.

In the quantization processing illustrated in FIG. 10, whether the processing target pixel is an adjacent pixel of a pixel to be formed by an abnormal nozzle is determined based on abnormal nozzle information. Further, in a case where the processing target pixel is the adjacent pixel of the pixel to be formed by the abnormal nozzle, the LUT for normal pixels may be changed to the LUT for adjacent pixels and processing from steps S101 to S112 may be performed.

Figure 11:
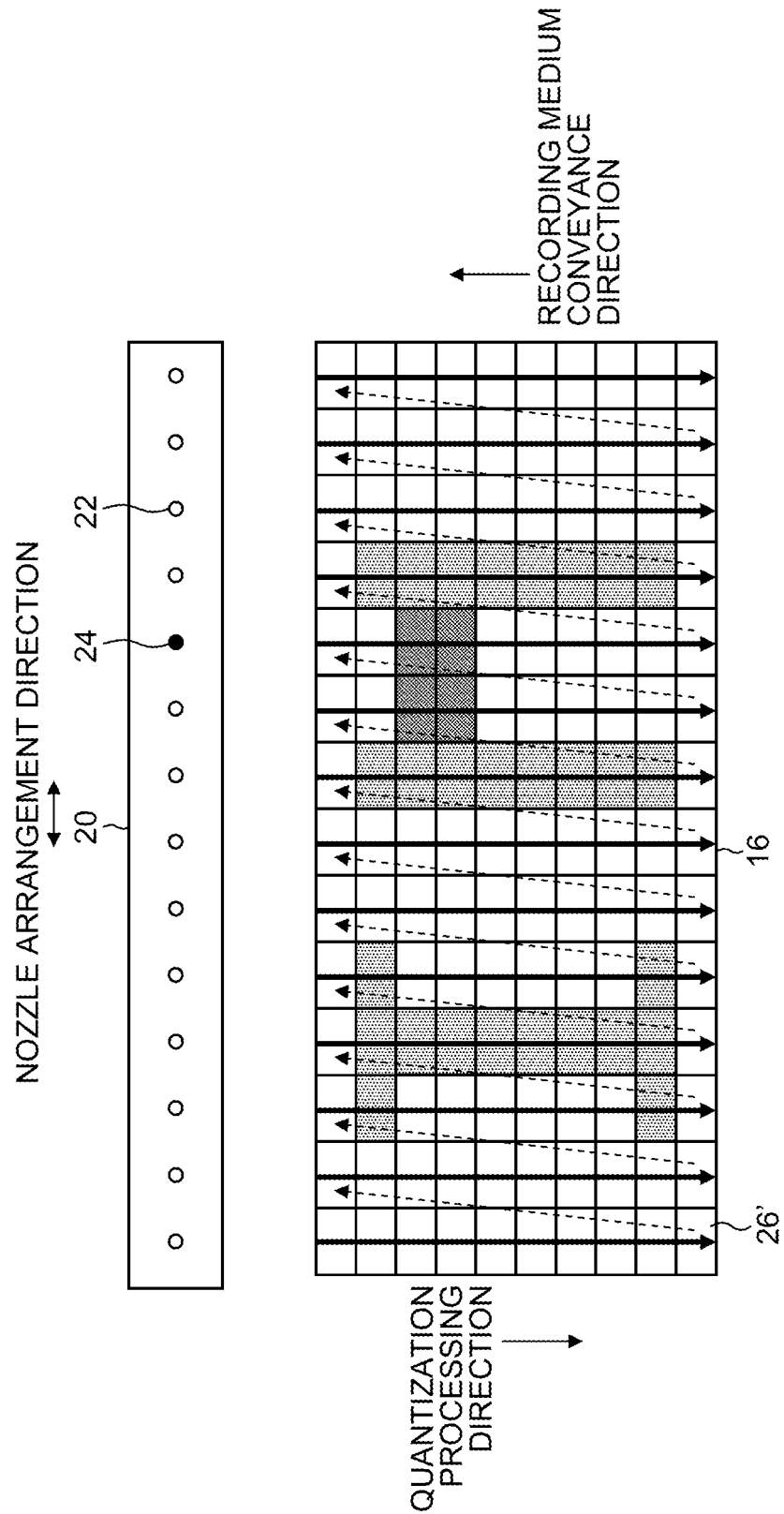
FIG. 11 is an explanatory diagram of a quantization processing direction.

FIG. 11 is an explanatory diagram of the quantization processing direction. In the image processing method shown in this example, each pixel forming input image data is shifted or deleted, and so on, in units of pixel columns (a group of pixels arranged in a direction orthogonal to the nozzle arrangement direction). Therefore, the quantization processing direction may be assumed to be the direction orthogonal to the nozzle arrangement direction.

For example, when quantization processing is performed along the nozzle arrangement direction, the quantization processing is started after waiting for the termination of processing of input image data conversion (step S18 in FIG. 1). Meanwhile, when the quantization processing is performed along a direction orthogonal to the nozzle arrangement direction, it is possible to start the quantization processing in order from a pixel column in which the processing of input image data conversion is finished, and the shortening of processing time is expected.

[Nozzle Assignment Process]

Figure 12:
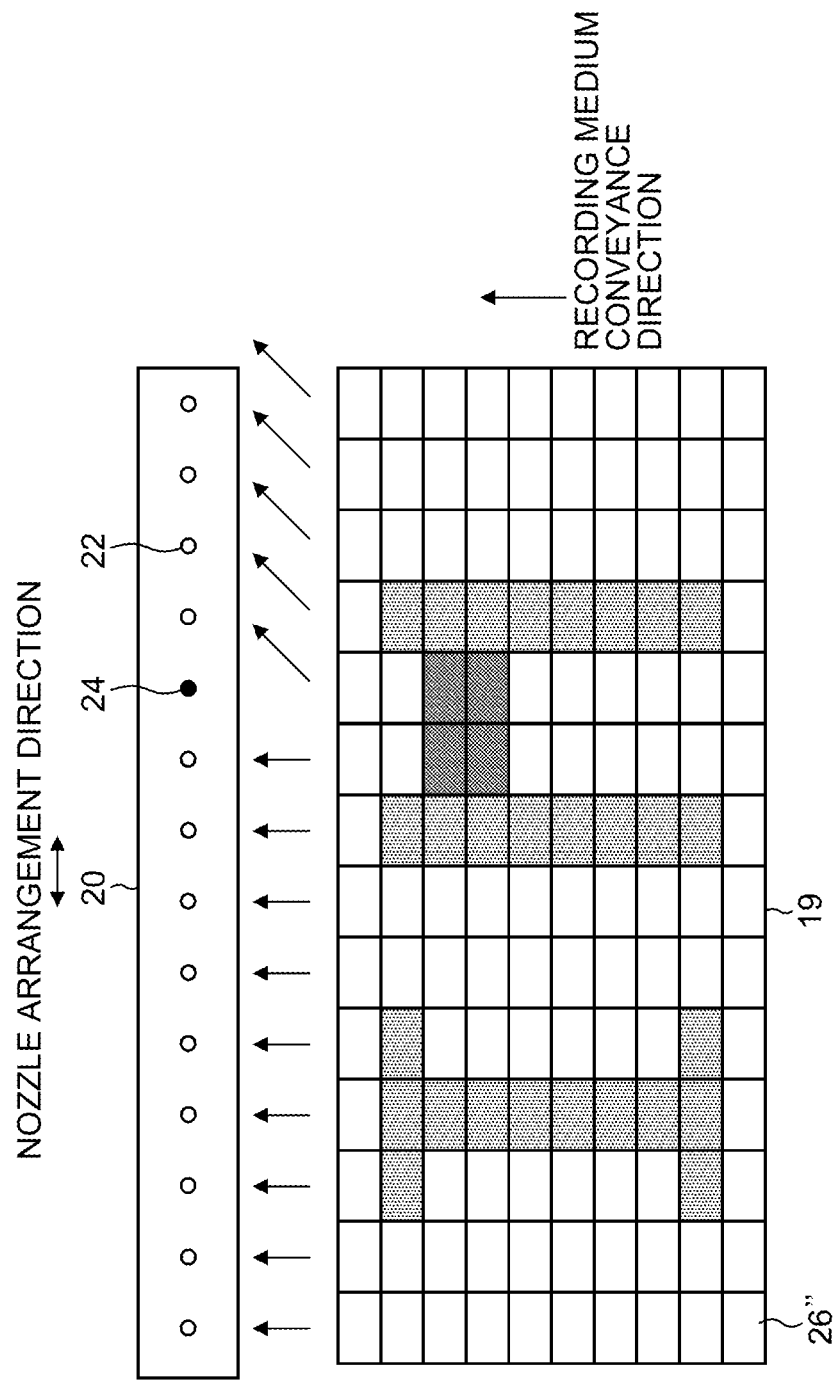
FIG. 12 is an explanatory diagram of nozzle assignment processing.

FIG. 12 is an explanatory diagram of the nozzle assignment process (step S22 in FIG. 1). In the nozzle assignment process, a normal nozzle 22 excluding an abnormal nozzle is assigned to each pixel 26" forming a halftone image 19. That is, by the input image data conversion process (step S18 in FIG. 1), since the relationship between the nozzle 22 and the pixel 26" (pixel column) is moved, the relationship between the normal nozzle 22 and the halftone image 19 is corrected according to the correspondence relationship between the input image data 14 and the normal nozzle 22.

Specifically, the pixel column shifted in the input image data conversion step is shifted again in pixel column units so as to be restored.

[Explanation of Image Processing Device]

Figure 13:
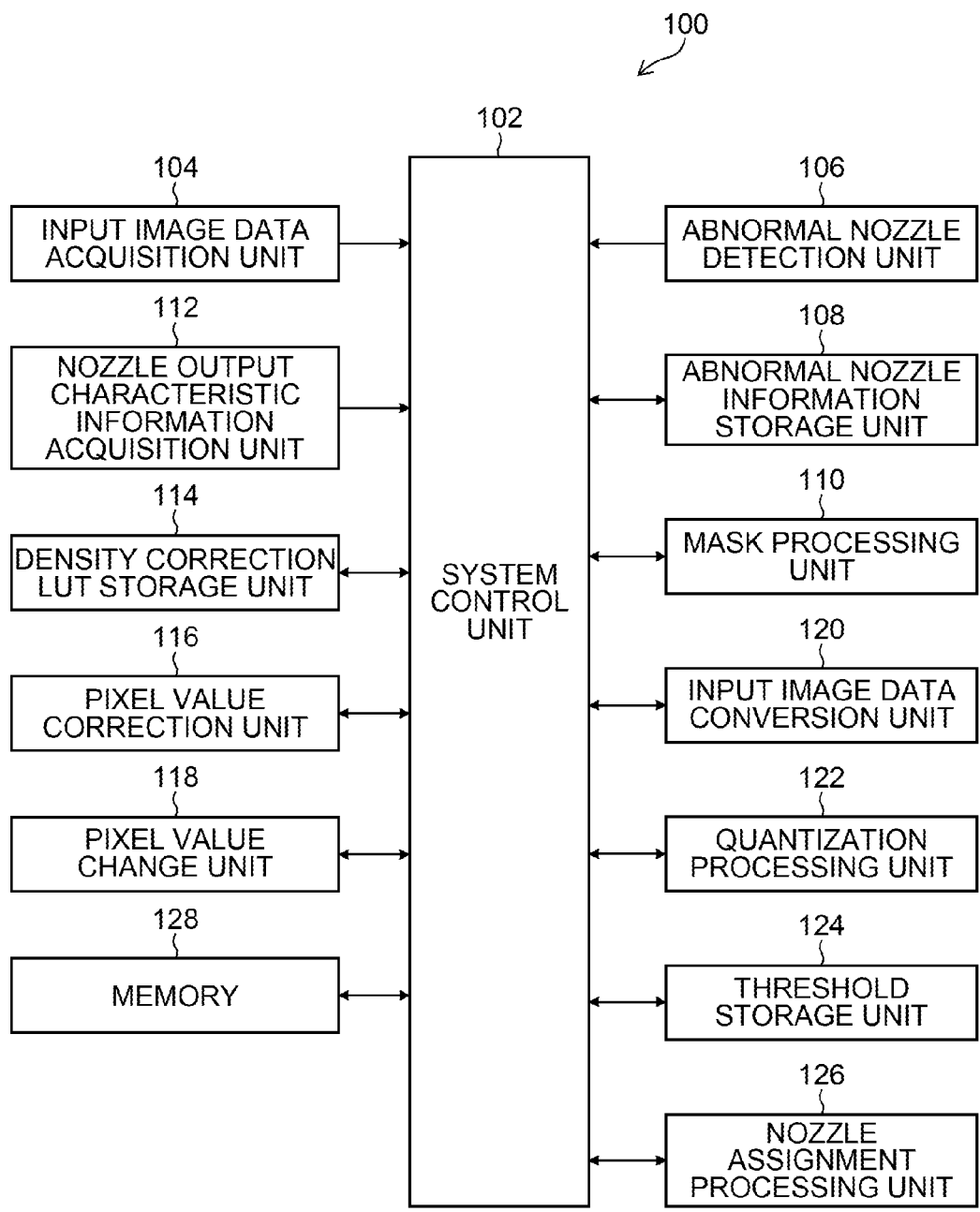
FIG. 13 is a block diagram illustrating a schematic configuration of an image processing device according to an embodiment of the present invention.

Next, an image processing device corresponding to the image processing method described using FIGS. 1 to 12 is described. FIG. 13 is a block diagram illustrating the whole configuration of the image processing device according to an embodiment of the present invention.

An image processing device 100 illustrated in the figure can be applied to an image processing unit (image processing unit) that generate an output image (halftone image) from input image data in an inkjet printing device.

The image processing device 100 illustrated in FIG. 13 includes: a system control unit 102 (component of the abnormal nozzle information acquisition unit) that performs integrated control of the entire device; an input image data acquisition unit 104 that acquires input image data; an abnormal nozzle detection unit 106 (component of the abnormal nozzle information acquisition unit) that detects an abnormal nozzle of an inkjet head; an abnormal nozzle information storage unit 108 (component of the abnormal nozzle information acquisition unit) that stores abnormal nozzle information; and a mask processing unit 110 (mask processing unit) that applies mask processing to the abnormal nozzle.

Moreover, the image processing device 100 includes: a nozzle output characteristic information acquisition unit 112 that acquires the output characteristic information on each nozzle; a density correction LUT storage unit 114 that stores the acquired nozzle output characteristic information in a lookup table format every nozzle; a pixel value correction unit 116 that corrects the pixel value of each pixel with reference to the density correction LUT; and a pixel value change unit 118 that changes the pixel value of a pixel formed by a normal nozzle in the surroundings of the abnormal nozzle 24 (see FIG. 5).

In addition, the image processing device 100 includes: an input image data conversion unit 120 (input data conversion unit) that converts the input image data 14 such that the pixel group 28 formed from the input image data 14 by the abnormal nozzle 24 is excluded from the target of quantization processing; a quantization processing unit 122 (quantization processing unit) that performs quantization processing on the converted input image data 14 (see FIG. 6); a threshold storage unit 124 that stores a threshold (threshold matrix) used for quantization processing; a nozzle assignment processing unit 126 (recording element assignment unit) that assigns each pixel of the image data after quantization processing (halftone image data) to the nozzle of the inkjet head 20; and a memory 128.

Since each unit illustrated in FIG. 13 corresponds to each process of the image processing method described using FIGS. 1 to 12, the detailed explanation is omitted here. The memory 128 illustrated in FIG. 13 is used as the primary storage area of data or the operation region of each unit.

Here, it may include a parameter storage unit that stores various parameters and conversion tables used for processing (operation) of each unit of the device, and a program storage unit that stores a program (software) used for processing (operation) of each unit of the device.

[Explanation of Effect]

Figure 14:
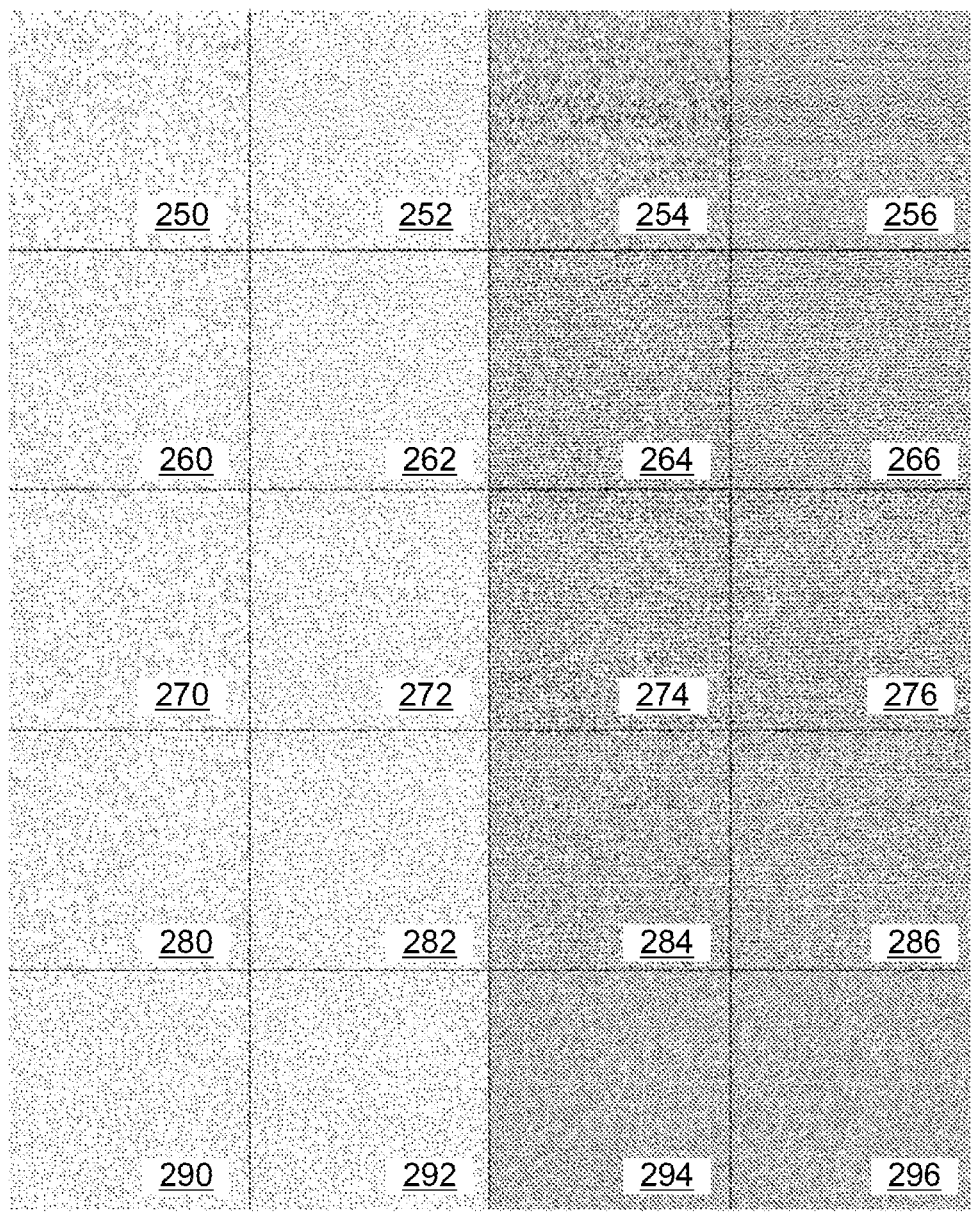
FIG. 14 is an explanatory diagram of an effect of an image processing method (device) according to an embodiment of the present invention.

FIG. 14 is an explanatory diagram of effects of the image processing method and device according to embodiments of the present invention. The horizontal sequence in the figure is "solid image (black) in a case where an abnormal nozzle (non-ejection nozzle) occurs in a two-nozzle period" (250 to 256), "solid image (black) in a case where an abnormal nozzle occurs in a three-nozzle period" (260 to 266), "solid image (black) in a case where an abnormal nozzle occurs in a four-nozzle period" (270 to 276), "solid image (black) in a case where an abnormal nozzle occurs at random" (280 to 286), and "solid image (black) in a case where an abnormal nozzle does not occur" (290 to 296) in order from the top.

Moreover, an image in which the last one digit of a reference numeral is "0" or "4" is a solid image in a case where the image processing method shown in this example is not applied, and an image in which the last one digit of the reference numeral is "2" or "6" is a solid image in a case where the image processing method shown in this example is applied.

The difference between the image in which the last one digit of the reference numeral is "0" or "2" and the image in which the last one digit of the reference numeral is "4" or "6" is a density difference. The image in which the last one digit of the reference numeral is "0" or "2" has a density of 90% of the maximum density on 8-bit digital data. The image in which the last one digit of the reference numeral is "4" or "6" has a density of 70% of the maximum density on the 8-bit digital data.

As illustrated in FIG. 14, in an image to which the image processing shown in this example is applied, even if an abnormal nozzle occurs, an artifact is not visually checked. Moreover, even in a case where the periodicity of the abnormal nozzle changes or the abnormal nozzle irregularly occurs, it is understood that it is possible to acquire the similar effect.

In addition, there is no difference in the effect by the difference in image density, and granular deterioration resulting from the occurrence of the artifact is prevented in various conditions.

According to the image processing method and device configured as above, pixels of input image data are shifted, converted and thereafter subjected to quantization processing such that a pixel group to be formed by an abnormal nozzle is excluded from the target of quantization processing based on abnormal nozzle information. Therefore, as a result of the lack of pixels to be formed by the abnormal nozzle due to the occurrence of the abnormal nozzle, it is suppressed that the pattern of quantization processing becomes discontinuous. Therefore, the occurrence of an artifact due to the lack of part of a pixel pattern is suppressed, and graininess of an output image is not deteriorated. By this means, the deterioration of image quality due to the occurrence of the abnormal nozzle is prevented.

[Example of Application to Inkjet Recording Device]

Next, an example of applying the above-mentioned image processing method and device to the inkjet recording device (image forming device) is described.

<Whole Configuration>

Figure 15:
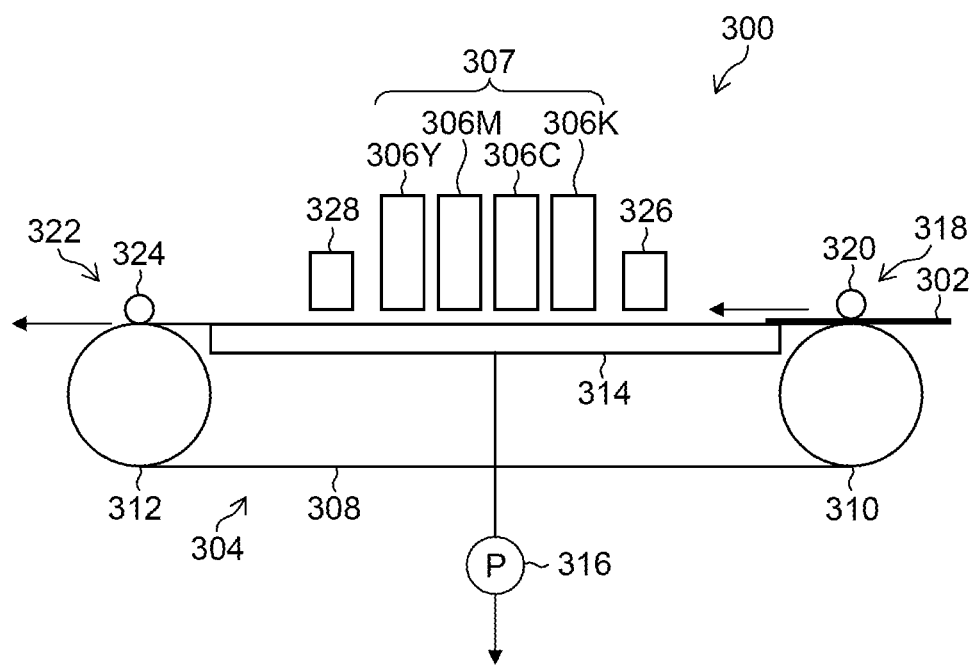
FIG. 15 is an entire configuration diagram of an inkjet recording device to which an image processing method (device) according to embodiments of the present invention is applied.

FIG. 15 is the whole configuration diagram of the inkjet recording device to which the above-mentioned image processing method is applied. An inkjet recording device 300 illustrated in the figure is an on-demand-type inkjet recording device and includes a recording medium conveyance unit 304 that retains and conveys a recording medium 302, and a printing unit 307 (image forming unit) including inkjet heads 306K, 306C, 306M and 306Y that eject color inks corresponding to K (black), C (cyan), M (magenta) and Y (yellow) to the recording medium 302 retained by the recording medium conveyance unit 304.

The recording medium conveyance unit 304 includes an endless conveyance belt 308 in which many suction holes (not illustrated) are installed in a recording medium retention region in which the recording medium 302 is retained, conveyance rollers (a drive roller 310 and a driven roller 312) around which the conveyance belt 308 is wound, a chamber 314 that is installed on the rear side of the conveyance belt 308 of the recording medium retention region (surface on the opposite side to the recording medium retention surface in which the recording medium 302 is retained) and communicated with the unillustrated suction holes installed in the recording medium retention region, and a vacuum pump 316 that causes a negative pressure in the chamber 314.

A pressing roller 320 to prevent the recording medium 302 from floating is installed in the carry-in unit 318 in which the recording medium 302 is carried, and a pressing roller 324 is installed in an ejection unit 322 from which the recording medium 302 is ejected.

The negative pressure is given from the suction hole installed in the recording medium retention region to the recording medium 302 carried in from the carry-in unit 318, and it is adsorbed and retained to the recording medium retention region of the conveyance belt 308.

On a conveyance path of the recording medium 302, a temperature control unit 326 to adjust the surface temperature of the recording medium 302 within a predetermined range is installed in the front side of the printing unit 307 (upstream side in the recording medium conveyance direction). A readout device 328 (readout sensor) that reads out an image recorded on the recording medium 302 is installed on the rear side of the printing unit 307 (downstream side in the recording medium conveyance direction).

The recording medium 302 carried in from the carry-in unit 318 is adsorbed and retained to the recording medium retention region of the conveyance belt 308, and, after temperature adjustment processing is applied by the temperature control unit 326, image recording is performed in the printing unit 307.

As illustrated in FIG. 15, the inkjet heads 306K, 306C, 306M and 306Y are disposed in this order from the upstream side in the recording medium conveyance direction. When the recording medium 302 passes immediately below the inkjet heads 306K, 306C, 306M and 306Y, the ink of each color of KCMY is deposited to the recording medium 302, and a desired color image is formed.

Here, a printing unit 307 is not limited to the above-mentioned mode. For example, inkjet heads 306LC and 16LM corresponding to LC (light cyan) and LM (light magenta) may be included. Moreover, the deposition order of the inkjet heads 306K, 306C, 306M and 306Y can be arbitrarily changed.

After a record image (test pattern) is read out by the readout device 328, the recording medium 302 in which the image is recorded is ejected from the ejection unit 322. The readout result of the readout device 328 is used to determine the ejection abnormality of the inkjet heads 306K, 306C 306M and 306Y.

The inkjet recording device 300 illustrated in FIG. 15 includes an unillustrated ink supply unit. The ink supply unit includes an ink tank that stores ink supplied to the inkjet heads 306K, 306C, 306M and 306Y every color (every head). Each of the ink tanks of the colors and the inkjet heads 306K, 306C 306M and 306Y are communicated with by an unillustrated ink supply path.

<Configuration of Printing Unit>

Figure 16:
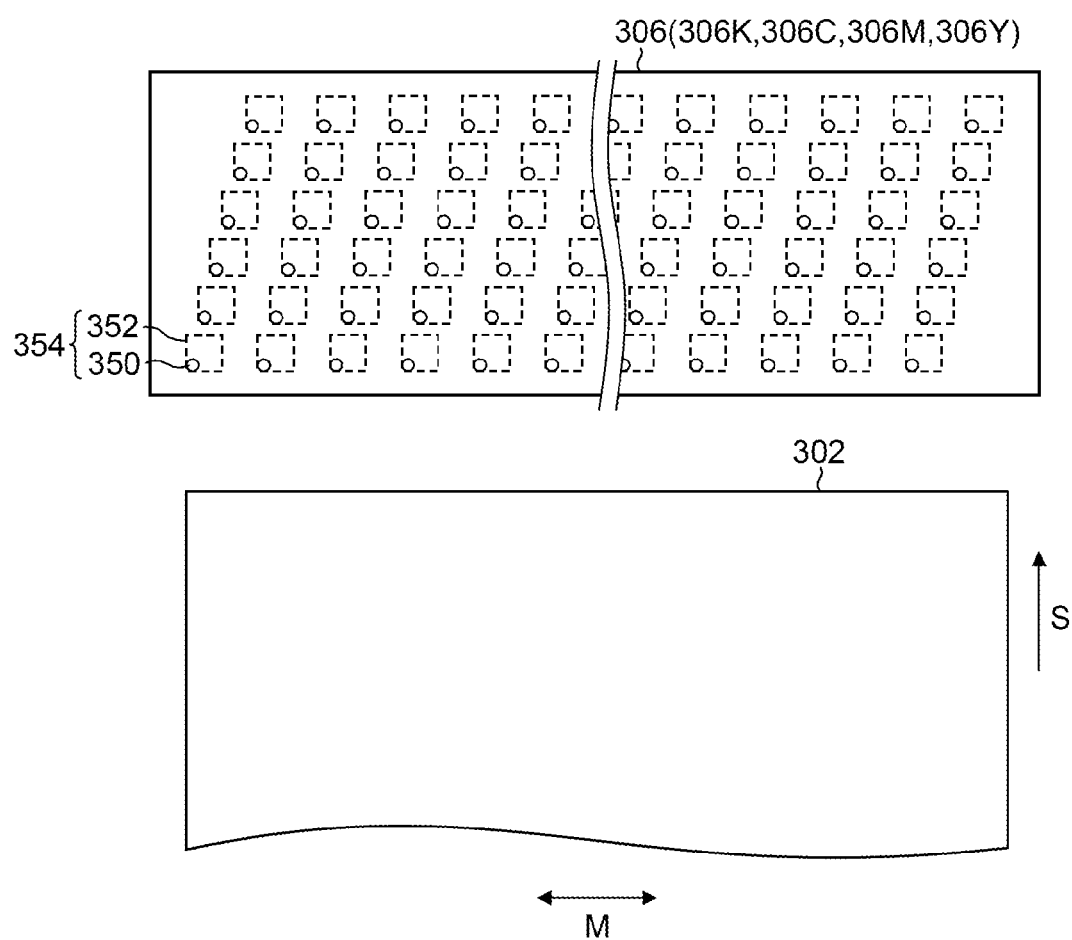
FIG. 16 is a plane perspective view illustrating a configuration example of a printing unit illustrated in FIG. 15.

FIG. 16 is a perspective plane view (view seen from the opposite side surface of an ink ejection surface) illustrating a structure example of the inkjet heads 306K, 306C, 306M and 306Y included in the printing unit 307. Since the inkjet heads 306K, 306C, 306M and 306Y illustrated in FIG. 16 can apply the same structure, it is assumed that common reference numeral 306 is assigned to the inkjet heads 306K, 306C, and 306M and 306Y here and illustrated.

An inkjet head 306 denotes a full-line type inkjet head in which multiple ejection elements (recording element) 354 including nozzles 350 and pressure chambers 352 are disposed over length that exceeds the total length in main scanning direction M of the recording medium 302.

By the single pass scheme in which the full-line type inkjet head 306 and the recording medium 302 are relatively moved only once, it is possible to record a record image over the whole area of the recording medium 302.

The inkjet head 306 illustrated in FIG. 16 has a structure in which multiple nozzles 350 (ejection elements 354) are disposed in a matrix manner along the row direction along main scanning direction M and a diagonal column direction that is not orthogonal to main scanning direction M and sub-scanning direction S.

As illustrated in FIG. 16, a substantial nozzle disposition density in main scanning direction M is densified by performing matrix disposition of the nozzle 350. Here, nozzle disposition of the inkjet head applicable to the present invention is not limited to the matrix disposition illustrated in FIG. 16.

For example, it is possible to apply a mode where a nozzle column in which the multiple nozzles 350 are disposed along the longitudinal direction of the inkjet head 306 is provided by one column or a mode where the multiple nozzles 350 are disposed in two columns in a staggered manner in the same direction.

As an ejection scheme of the inkjet head 306, it is possible to apply various ejection schemes such as a piezoelectric scheme using the deflection of a piezoelectric element and a thermal scheme using a film boiling phenomenon of ink. The inkjet head 306 to which the piezoelectric scheme is applied includes the nozzle 350 that ejects ink, the pressure chamber 352 that communicates with the nozzle 350 and piezoelectric elements provided on at least one wall surface of the pressure chamber 352.

The piezoelectric element has a structure in which a piezoelectric substance is sandwiched between the upper electrode and the lower electrode, deflection is caused by applying a drive voltage between the upper electrode and the lower electrode, and, by transforming the pressure chamber 352 by the deflection of the piezoelectric element, ink accommodated in the pressure chamber 352 is ejected from the nozzle 350.

Moreover, the inkjet head to which the thermal scheme is applied includes a heater that heats ink accommodated in a pressure chamber (liquid chamber) 352, and generates bubbles by momentarily heating ink in the pressure chamber 352, and ejects the ink from the nozzle 350.

<Explanation of Control System>

Figure 17:
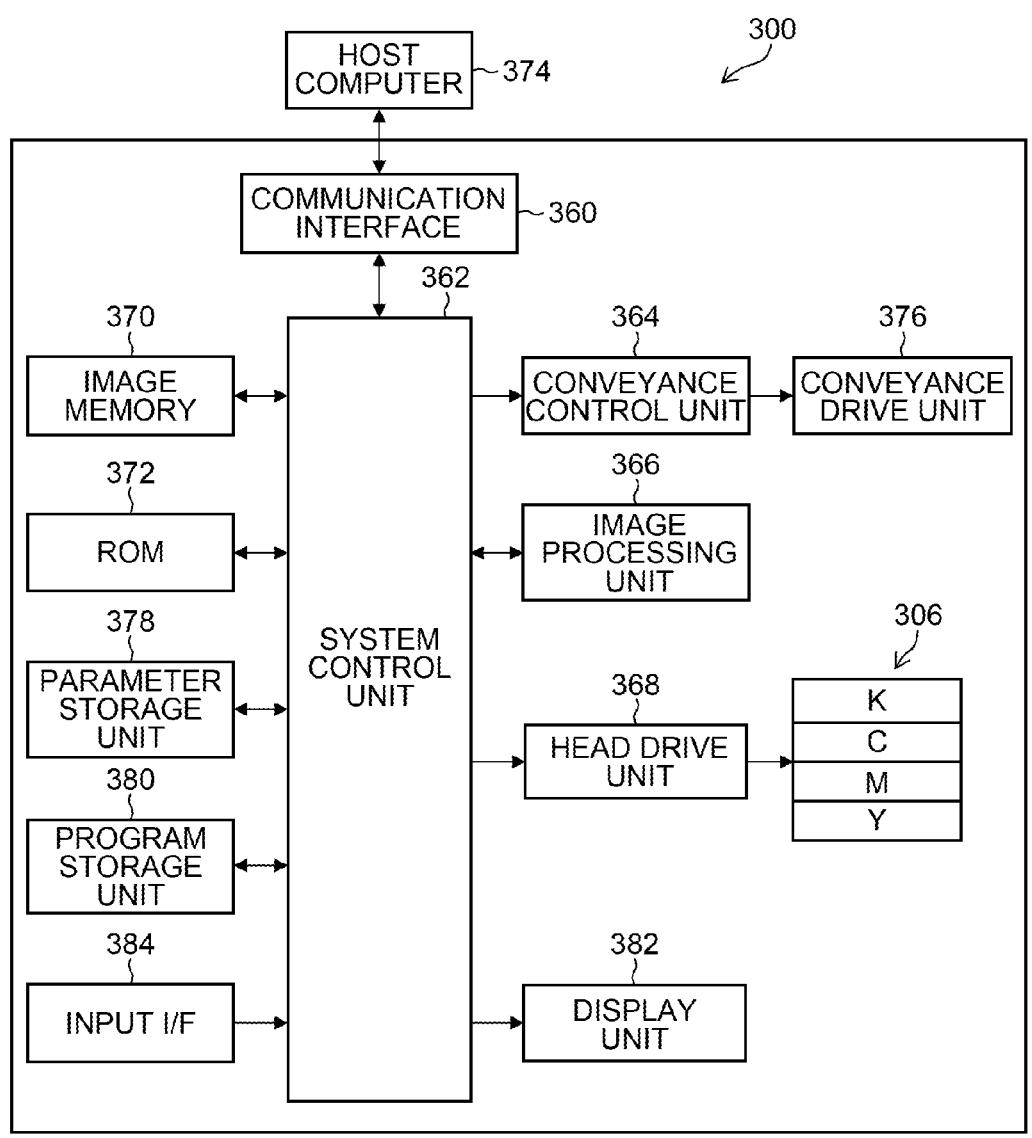
FIG. 17 is a block diagram illustrating a configuration of a control system of an inkjet recording device illustrated in FIG. 15.

FIG. 17 is a block diagram illustrating a schematic configuration of a control system of the inkjet recording device 300. As illustrated in the figure, the inkjet recording device 300 includes a communication interface 360, a system control unit 362, a conveyance control unit 364, an image processing unit 366 and a head drive unit 368, and further includes an image memory 370, a ROM (Read-Only Memory) 372 and the like.

The communication interface 360 denotes an interface unit that receives raster image data sent from a host computer 374. The communication interface 360 may adopt a serial interface such as a USB (Universal Serial Bus) or may adopt a parallel interface such as Centronics. The communication interface 360 may mount a buffer memory (not illustrated) to speed up communication.

The system control unit 362 is configured with a central processing unit (CPU) and a peripheral circuit, and so on. The system control unit 362 functions as a control device that controls the whole of the inkjet recording device 300 according to a predetermined program and functions as an arithmetic unit that performs various calculations. In addition, the system control unit 362 functions as a memory controller of the image memory 370 and the ROM 372.

That is, the system control unit 362 controls each unit such as the communication interface 360 and the conveyance control unit 364, performs communication control with the host computer 374, performs reading/writing control, and so on, of the image memory 370 and the ROM 372, and generates a control signal that controls each unit described above.

Image data (data of a record image) fed from the host computer 374 is imported in the inkjet recording device 300 through the communication interface 360 and subjected to predetermined image processing by the image processing unit 366.

The image processing unit 366 denotes a control unit which has a signal (image) processing function that performs processing such as various kinds of processing and correction to generate a signal for printing control from image data and which supplies the generated printing data (dot data) to the head drive unit 368.

When required signal processing is performed in the image processing unit 366, the ejection droplet amount (deposition amount) of the inkjet head 306 and the ejection timing are controlled through the head drive unit 368 based on the printing data (halftone image data).

By this means, a desired dot size and dot disposition are realized. Here, the head drive unit 368 illustrated in FIG. 17 may include a feedback control system to keep the driving condition of the inkjet head 306 constant.

The image processing device 100 described using FIGS. 1 to 13 are applicable to the image processing unit 366 in FIG. 17. Here, the control system of the inkjet recording device 300 illustrated in FIG. 17 can be arbitrarily shared with each component illustrated in FIG. 13.

The conveyance control unit 364 controls the conveyance timing and conveyance speed of a recording medium (see FIG. 15) based on the printing data generated by the image processing unit 366. A conveyance drive unit 376 in FIG. 17 includes a motor that drives the drive roller 310 (312) of the recording medium conveyance unit 304 that conveys the recording medium, and the conveyance control unit 364 functions as a driver of the motor.

The image memory 370 (temporary storage memory) has a function as a temporary storage unit for temporarily storing the image data input through the communication interface 360 once, and a function as a development region of various programs stored in the ROM 372 and an operation working space of the CPU (for example, working space of the image processing unit 366). A volatile memory (RAM (Random Access Memory)) that can be sequentially read and written is used for the image memory 370.

The ROM 372 stores a program executed by the CPU of the system control unit 362 and various kinds of data and control parameters required to control each unit of the device, and so on, and data is read and written through the system control unit 362. The ROM 372 is not limited to a memory including semiconductor elements, and a magnetic medium such as a hard disk may be used. Moreover, a detachable storage medium including an external interface may be used.

A parameter storage unit 378 stores various control parameters required for the operation of the inkjet recording device 300. The system control unit 362 arbitrarily reads out a parameter required for control and optionally performs the update (rewriting) of various parameters.

A program storage unit 380 denotes storage a unit for storing a control program to operate the inkjet recording device 300. When the system control unit 362 (or each unit of the device) performs control of each unit of the device, a necessary control program is read out from the program storage unit 380 and the control program is arbitrarily executed.

A display unit 382 denotes a unit for displaying various kinds of information fed from the system control unit 362, and a general-purpose display device such as a LCD (Liquid Crystal Display) monitor is applied. Here, the lighting of a lamp (blink and lights-out) may be applied to the display form of the display unit 382. Moreover, it may include a sound (voice) output unit such as a speaker.

An information input unit such as a keyboard, a mouse and a joy stick is applied to an input interface (LT) 384. Information input through the input interface 384 is fed to the system control unit 362.

Here, the conveyance of a recording medium is not limited to a belt conveyance scheme, and it is possible to apply other conveyance schemes such as an impression cylinder conveyance scheme and a roller conveyance scheme.

<Other Device Configuration Examples>

Figure 18:
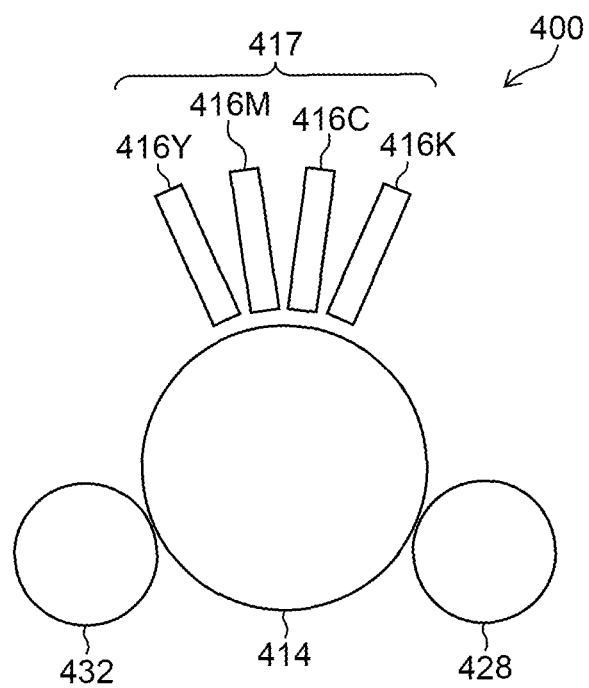
FIG. 18 is an entire configuration diagram of another device configuration.

FIG. 18 is the whole configuration diagram illustrating the schematic configuration of an inkjet recording device 400 in which the impression cylinder conveyance scheme is applied to the conveyance of a recording medium. The inkjet recording device 400 illustrated in the figure adopts the impression cylinder conveyance scheme in which the recording medium is fixed to the outer peripheral surface of an impression cylinder 414 and the recording medium is rotated and conveyed along the outer peripheral surface of the impression cylinder 414 by rotating the impression cylinder 414.

Inkjet heads 416K, 416C, 416M and 416Y (printing unit 417) are disposed along the outer peripheral surface of the impression cylinder 414 while they are inclined to the horizontal surface. Here, the inkjet heads 416K, 416C, 416M and 416Y can adopt the configurations similar to the inkjet heads 306K, 306C, 306M and 306Y illustrated in FIG. 16.

A recording medium fed from an unillustrated paper feeding unit is retained to a transfer cylinder 428 and transferred to the impression cylinder 414. The recording medium subjected to image formation is transferred from the impression cylinder 414 to a transfer cylinder 432 on the subsequent side.

Here, in the inkjet recording device 400 illustrated in FIG. 18, a previous process (such as a pre-processing process of the recording medium) and subsequent process (such as a drying process and a fixing process) of image formation may be added.

Here, the configuration of the inkjet recording device described using FIGS. 15 to 18 is one example, and the addition, deletion and change of the configuration can be arbitrarily performed.

This example has been described using image processing in image formation of the inkjet scheme as an example, but the image processing method illustrated in this example is also applicable to image formation of others than the inkjet printing scheme such as image formation of the electrophotography scheme.

This example has been described using image processing in image formation of the inkjet scheme as an example, but the image processing method illustrated in this example is also applicable to image formation of others than the inkjet printing scheme such as image formation of the electrophotography scheme.

Moreover, as for the above-mentioned image processing method and device, it is possible to arbitrarily change, add or delete components without departing from the scope of the present invention.

[Invention Disclosed in this Specification]

As understood from the description of the embodiments of the invention described above in detail, this specification contains disclosure of various technical ideas including at least modes described below.

(First mode) An image processing method including: an abnormal recording element information acquisition step of acquiring abnormal recording element information; a mask processing step of applying mask processing to an abnormal recording element based on the acquired abnormal recording element information; an input image data conversion step of converting input image data such that a pixel to be formed by the abnormal recording element is excluded based on the acquired abnormal recording element information; a quantization processing step of applying quantization processing that converts the converted input image data to image data having a gradation number less than a gradation number of the converted input image data; and a recording element assignment step of assigning each pixel forming image data after quantization processing to a normal recording element excluding the abnormal recording element.

According to the first mode, the abnormal recording element is masked based on the abnormal recording element information, and the input image data is converted such that the pixel to be formed by the abnormal recording element is excluded from the target of quantization processing. Therefore, the occurrence of discontinuity of quantization processing due to the mask of the abnormal recording element is suppressed, the occurrence of an artifact resulting from the discontinuity of quantization processing is suppressed, and graininess of an output image is not deteriorated.

As one example of the recording element in such a mode, there are a nozzle (ejection element) included in the inkjet head and an LED (Light Emitting Diode) of the electrophotography scheme, and so on.

(Second mode): In the first mode, the image processing method in which, in the input image data conversion step, a pixel formed by the abnormal recording element is excluded from a target of quantization processing, a pixel formed by a normal recording element different is shifted from the abnormal recording element, the excluded pixel is compensated for and input image data of a quantization processing target is generated.

According to such a mode, by shifting and compensating for a pixel formed by a normal nozzle instead of the pixel excluded from the target of quantization processing, the continuity of a quantization processing pattern is maintained.

(Third mode): In the second mode, the image processing method in which, in the input image data conversion step, two-dimensionally arranged pixels are shifted every one group of a column direction orthogonal to an arrangement direction of a recording element.

Such a mode demonstrates an effect especially in single pass image recording scheme using a full-line type recording head.

(Fourth mode): In any one of the first to third modes, the image processing method in which, in the recording element assignment step, each pixel of the image data after quantization processing is assigned to a recording element such that a relationship between a recording element and a pixel in the input image data before conversion is maintained.

According to such a mode, the relationship between a nozzle of input image data and a pixel is maintained in an output image.

(Fifth mode): In the fourth mode, the image processing method according to claim 4, in which, in the recording element assignment step, two-dimensionally arranged pixels are shifted every one group of a column direction orthogonal to an arrangement direction of a recording element.

Such a mode demonstrates an effect especially in a single pass image recording scheme using a full-line type recording head.

(Sixth mode): In any of the first to fifth modes, the image processing method further including a pixel value change step of changing a pixel value of a pixel formed by a peripheral recording element of the abnormal recording element so as to compensate for a lack of a pixel value formed by the abnormal recording element.

According to such a mode, it is possible to compensate for the lack of a pixel lacked by the occurrence of the abnormal recording element, and the occurrence of an artifact is suppressed.

(Seventh mode): In any of the first to sixths modes, the image processing method further including a pixel value correction step of correcting a pixel value every recording element, based on an output characteristic of each recording element.

According to such a mode, the occurrence of an artifact resulting from the storage characteristic of the recording element is suppressed.

A mode is preferable in which the relationship between the pixel value and the output value is stored in a lookup table format every recording element.

(Eighth mode): In the sixth or seventh mode, the image processing method in which, in the quantization processing step, quantization processing is performed such that an image after quantization processing is expressed at multi-gradation by a dot size or dot number with respect to one pixel, and, regarding a pixel formed by a recording element near the abnormal recording element, a dot is selected so as to exceed a size or dot number to be originally formed.

In such a mode, a mode is preferable in which a lookup table that stores the dot size or dot number of each gradation is switched.

(Ninth mode): In the eighth mode, the image processing method in which, in the quantization processing step, when the dot size or dot number of the pixel formed by the recording element near the abnormal recording element is changed, a dot size or dot number is selected according to a pixel value of the pixel.

For example, in a case where four gradations are expressed using three kinds of dot sizes of large, medium and small, a mode is possible in which pixels formed by a nozzle near the abnormal nozzle are all assumed to be does of the large size.

(Tenth mode): In the first to ninth modes, the image processing method in which, in the quantization processing step, quantization processing is performed along a direction orthogonal to an arrangement direction of a recording element.

According to such a mode, it is possible to start quantization processing from a part in which input image data is converted, and it is possible to perform conversion of the input image data and quantization processing in parallel.

(Eleventh mode): An image processing device including: an abnormal recording element information acquisition unit configured to acquire abnormal recording element information; a mask processing unit configured to apply mask processing to an abnormal recording element based on the acquired abnormal recording element information; an input image data conversion unit configured to convert input image data such that a pixel to be formed by the abnormal recording element is excluded based on the acquired abnormal recording element information; a quantization processing unit configured to apply quantization processing that converts the converted input image data to image data having a gradation number less than a gradation number of the converted input image data; and a recording element assignment unit configured to assign each pixel forming image data after quantization processing to a normal recording element excluding the abnormal recording element.

As an example of the image processing device, there is an inkjet recording device that ejects color ink from an inkjet head and forms a color image on a recording medium.

(Twelfth mode): In the eleventh mode, the image processing device that executes an image processing method according to at least any of the second to tenth modes.

(Thirteenth mode): An image forming device including: an image processing unit configured to perform predetermined image processing on input image data; and an image forming unit configured to form an image on a recording medium based on the processed image data, in which the image processing unit includes an image processing device according to the eleventh or twelfth mode.

(Fourteenth mode): An inkjet recording device including: an image processing unit configured to perform predetermined image processing on input image data; and an inkjet head that deposits ink onto a recording medium and forms an image based on the processed image data, in which the image processing unit includes an image processing device according to the eleventh or twelfth mode.

What is claimed is:

1. An image processing method comprising:
    an abnormal recording element information acquisition step of acquiring abnormal recording element information;
    a mask processing step of applying mask processing to an abnormal recording element based on the acquired abnormal recording element information;
    an input image data conversion step of converting input image data such that a pixel to be formed by the abnormal recording element is excluded based on the acquired abnormal recording element information;
    a quantization processing step of applying quantization processing that converts the converted input image data to image data having a gradation number less than a gradation number of the converted input image data; and
    a recording element assignment step of assigning each pixel forming image data after quantization processing to a normal recording element excluding the abnormal recording element.

2. The image processing method according to claim 1, wherein, in the input image data conversion step, a pixel formed by the abnormal recording element is excluded from a target of quantization processing, a pixel formed by a normal recording element different is shifted from the abnormal recording element, the excluded pixel is compensated for and input image data of a quantization processing target is generated.

3. The image processing method according to claim 2, wherein, in the input image data conversion step, two-dimensionally arranged pixels are shifted every one group of a column direction orthogonal to an arrangement direction of a recording element.

4. The image processing method according to claim 1, wherein, the recording element assignment step, each pixel of the image data after quantization processing is assigned to a recording element such that a relationship between a recording element and a pixel in the input image data before conversion is maintained.

5. The image processing method according to claim 4, wherein, in the recording element assignment step, two-dimensionally arranged pixels are shifted every one group of a column direction orthogonal to an arrangement direction of a recording element.

6. The image processing method according to claim 1, further comprising
    a pixel value change step of changing a pixel value of a pixel formed by a peripheral recording element of the abnormal recording element so as to compensate for a lack of a pixel value formed by the abnormal recording element.

7. The image processing method according to claim 6, wherein, in the quantization processing step, quantization processing is performed such that an image after quantization processing is expressed at multi-gradation by a dot size or dot number with respect to one pixel, and, regarding a pixel formed by a recording element near the abnormal recording element, a dot is selected so as to exceed a size or dot number to be originally formed.

8. The image processing method according to claim 7, wherein, in the quantization processing step, when the dot size or dot number of the pixel formed by the recording element near the abnormal recording element is changed, a dot size or dot number is selected according to a pixel value of the pixel.

9. The image processing method according to claim 1, further comprising
a pixel value correction step of correcting a pixel value every recording element, based on an output characteristic of each recording element.

10. The image processing method according to claim 1, wherein, in the quantization processing step, quantization processing is performed along a direction orthogonal to an arrangement direction of a recording element.

11. An image processing device comprising:
an abnormal recording element information acquisition unit configured to acquire abnormal recording element information;
a mask processing unit configured to apply mask processing to an abnormal recording element based on the acquired abnormal recording element information;
an input image data conversion unit configured to convert input image data such that a pixel to be formed by the abnormal recording element is excluded based on the acquired abnormal recording element information;
a quantization processing unit configured to apply quantization processing that converts the converted input image data to image data having a gradation number less than a gradation number of the converted input image data; and
a recording element assignment unit configured to assign each pixel forming image data after quantization processing to a normal recording element excluding the abnormal recording element.

12. An image forming device comprising:
an image processing unit configured to perform predetermined image processing on input image data; and
an image forming unit configured to form an image on a recording medium based on the processed image data,
wherein the image processing unit includes an image processing device according to claim 11.

13. An inkjet recording device comprising:
an image processing unit configured to perform predetermined image processing on input image data; and
an inkjet head that deposits ink onto a recording medium and forms an image based on the processed image data,
wherein the image processing unit includes an image processing device according to claim 11.

* * * * *